（12）United States Patent
Nakajin et al.

(10) Patent No.: US 8,534,406 B2
(45) Date of Patent: Sep. 17, 2013

(54) MOTORCYCLE

(75) Inventors: Makoto Nakajin, Wako (JP); Masaru Hisadomi, Wako (JP); Hiroshi Yamada, Wako (JP); Mitsuru Terada, Wako (JP); Tsubasa Ishii, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 229 days.

(21) Appl. No.: 12/881,927

(22) Filed: Sep. 14, 2010

(65) Prior Publication Data

US 2011/0073400 A1 Mar. 31, 2011

(30) Foreign Application Priority Data

Sep. 30, 2009 (JP) ................................. 2009-227646

(51) Int. Cl.
*B62K 11/00* (2013.01)
(52) U.S. Cl.
USPC ............................ 180/219; 180/228; 180/291
(58) Field of Classification Search
USPC .................. 180/219, 228, 309, 291, 292, 296
See application file for complete search history.

(56) References Cited

U.S. PATENT DOCUMENTS

| 6,986,400 B2 * | 1/2006 | Osada | 180/228 |
| 2007/0089922 A1 * | 4/2007 | Iwasaki | 180/219 |

FOREIGN PATENT DOCUMENTS

| EP | 1 752 370 A2 | 2/2007 |
| JP | 2008-163875 A | 7/2008 |
| JP | 2008163875 A * | 7/2008 |

* cited by examiner

*Primary Examiner* — Tony Winner
*Assistant Examiner* — Jacob Knutson
(74) *Attorney, Agent, or Firm* — Westerman, Hattori, Daniels & Adrian, LLP

(57) ABSTRACT

A motorcycle has a large accommodating space and an enlarged capacity of a fuel filter. The motorcycle includes: a fuel tank disposed on the upper side of the rear wheel and on the rear side of the luggage box; a rear fender provided between the rear frames and, disposed between the luggage box and the rear wheel, and covering the rear wheel on the front and upper sides of the rear wheel; a fuel supply path; and a fuel secondary filter. The rear fender is so disposed that its front portion faces a rear wall of the luggage box, the front portion is inclined rearwardly upward so that the distance thereto from the rear wall increases along an upward direction, and the fuel secondary filter is disposed between the rear wall of the luggage box and the front portion of the rear fender.

6 Claims, 21 Drawing Sheets

1

MOTORCYCLE

TECHNICAL FIELD

The present application relates to an improvement in a motorcycle. Particularly, the application relates to a layout structure of a fuel filter provided in a motorcycle.

BACKGROUND OF THE INVENTION

As a conventional motorcycle, there has been known one in which a fuel filter is mounted to a body frame, and a luggage box is disposed on the upper side of the fuel filter (refer to, for example, Japanese Patent Laid-open No. 2008-163875).

According to FIGS. 1 and 2 of Japanese Patent Laid-open No. 2008-163875, a bridge member 8 is bridgingly disposed between a pair of left and right seat pipes 7 constituting a body frame 2, a filter bracket 29 is attached to the bridge member 8, and a fuel filter 28 is held by the filter bracket 29.

A goods accommodating chamber 23 is disposed on the upper side of the fuel filter 28.

SUMMARY OF THE INVENTION

Since the fuel filter 28 is attached to an upper portion of the bridge member 8, a bottom wall of the goods accommodating chamber 23 on the upper side of the fuel filter 28 must be raised so as to avoid interference with the fuel filter 28. This results in a decrease in the capacity of the goods accommodating chamber 23.

On the other hand, since the fuel filter 28 is disposed between the bridge member 8 and the goods accommodating chamber 23, the capacity of the fuel filter 28 is restricted.

Accordingly, it is an object of the present application to provide a motorcycle in which a large accommodating space can be secured and the capacity of a fuel filter can be enlarged.

One aspect of the disclosure resides in a motorcycle including: a single main frame extending rearwardly downward from a head pipe; a pair of left and right rear frames extending rearwardly upward from the main frame; a luggage box disposed on the front side of a rear wheel and on the upper side of the rear frames; a fuel tank disposed on the upper side of the rear wheel and on the rear side of the luggage box; a rear fender provided between the left and right rear frames, disposed between the luggage box and the rear wheel, and covering the rear wheel on the front and upper sides of the rear wheel; a fuel supply path for supplying a fuel in the fuel tank to the engine side; and a fuel filter disposed in the course of the fuel supply path; characterized in that the rear fender is so disposed that its front portion faces a rear wall of the luggage box, the front portion being inclined rearwardly upward so that the distance thereto from the rear wall increases along an upward direction; and the fuel filter is disposed between the rear wall of the luggage box and the front portion of the rear fender.

Another aspect of the disclosure is characterized in that the rear fender has a protuberant portion which is projected toward the rear wall of the luggage box for avoiding interference with the rear wheel, the rear frames are disposed on the left and right sides of the protuberant portion, and the fuel filter is disposed between the protuberant portion and the rear frame.

Another aspect of the disclosure is characterized in that the fuel filter is so disposed that its longitudinal direction is set along an extending direction of the rear frame, together with the protuberant portion.

Another aspect of the disclosure is characterized in that the rear fender is provided, between the protuberant portion and the rear frame, with a recessed portion which is recessed toward the rear wheel and which accommodates at least a part of the fuel filter.

Another aspect of the disclosure is characterized in that the fuel supply path is provided with a fuel pump, an injector for injecting the fuel to the engine side, and a fuel primary filter disposed on the upstream side of the fuel pump; the fuel filter is a fuel secondary filter disposed on the downstream side of the fuel pump and the fuel primary filter; the fuel secondary filter is set to be finer in pore size than the fuel primary filter, and is locked onto the rear fender in the state of being along the inclination of the front portion of the rear fender; and the luggage box is detachably attached to the rear frame and the fuel tank.

Another aspect of the disclosure is characterized in that the luggage box has a capacity sufficient for accommodating a rider's helmet.

Another aspect of the disclosure is characterized in that the fuel supply path is provided, on the downstream side of the fuel secondary filter, with a pressure regulator by which part of the fuel is returned to the fuel tank side when the fuel pressure in the fuel supply path between the injector and the fuel pump is increased to reach a predetermined pressure; and the injector and the pressure regulator are disposed on the front side of the luggage box.

Another aspect of the disclosure resides in a motorcycle including: a head pipe; frame members extending rearward from the head pipe; a luggage box disposed on the upper side of rear portions of the frame members; a fuel tank disposed on the upper side of rear portions of the frame members and on the rear side of the luggage box; a fuel supply path for supplying a fuel in the fuel tank to the engine side; and a fuel filter disposed in the course of the fuel supply path; characterized in that the fuel filter is disposed between a rear wall of the luggage box and a front wall of the fuel tank.

Another aspect of the disclosure is characterized in that a cross pipe is disposed between the rear wall of the luggage box and the front wall of the fuel tank, the cross pipe extends in the vehicle width direction to interconnects a pair of the left and right frame members; and the fuel filter is dismountably supported on the cross pipe and has its longitudinal direction disposed along the cross pipe.

According to an aspect of the disclosure the rear fender is so disposed that its front portion faces a rear wall of the luggage box, the front portion being inclined rearwardly upward so that the distance thereto from the rear wall increases along an upward direction, and the fuel filter is disposed between the rear wall of the luggage box and the front portion of the rear fender. Therefore, the fuel filter can be disposed while effectively utilizing the space formed between the front portion of the rear fender, which is inclined rearwardly upward so that the distance thereto from the rear wall increases along the upward direction, and the rear wall of the luggage box. Accordingly, the fuel filter can be disposed while securing a large capacity of the luggage box.

In addition, since the front portion of the rear fender is inclined rearwardly upward so that the distance thereto from the rear wall increases along the upward direction, the space formed between the front portion of the rear fender and the luggage box is gradually enlarged along the upward direction, so that a large type fuel filter can be disposed in the space.

An increase in the size of the fuel filter makes it possible to reduce the frequency of replacement of the fuel filter and to permits easier attenuation of pulsation of the fuel.

According to an aspect of the disclosure, the rear fender has a protuberant portion which is projected toward the rear wall of the luggage box for avoiding interference with the rear wheel, the rear frames are disposed on the left and right sides of the protuberant portion, and the fuel filter is disposed between the protuberant portion and the rear frame. Therefore, the protuberant portion provided as part of the rear fender can be disposed closer to the rear wall of the luggage box and, hence, the vehicle can be made smaller in size, as compared with the case where the fuel filter is disposed between the protuberant portion and the rear wall of the luggage box.

According to an aspect of the disclosure, the fuel filter is so disposed that its longitudinal direction is set along an extending direction of the rear frame, together with the protuberant portion. Therefore, the protuberant portion and the fuel filter and the rear frame can be disposed close to one another in the vehicle width direction, and, accordingly, the vehicle width can be reduced.

According to another aspect of the disclosure, the rear fender is provided, between the protuberant portion and the rear frame, with a recessed portion which is recessed toward the rear wheel and which accommodates at least a part of the fuel filter. Therefore, the space formed between the rear wall of the luggage box and the rear fender can be set larger by the presence of the recessed portion, and, accordingly, a large type fuel filter can be disposed in the space.

According to another aspect of the disclosure, the fuel supply path is provided with a fuel pump, an injector for injecting the fuel to the engine side, and a fuel primary filter disposed on the upstream side of the fuel pump; the fuel filter is a fuel secondary filter disposed on the downstream side of the fuel pump and the fuel primary filter; the fuel secondary filter is set to be finer in pore size than the fuel primary filter, and is locked onto the rear fender in the state of being along the inclination of the front portion of the rear fender; and the luggage box is detachably attached to the rear frame and the fuel tank. Therefore, larger dust can be caught by the fuel primary filter, and finer dust having passed through the fuel primary filter can be caught by the fuel secondary filter. Accordingly, larger dust is unlikely caught by the fuel secondary filter, so that the possibility of clogging of the fuel secondary filter can be lowered, and the frequency of replacement of the fuel secondary filter required can be lowered.

Further, the fuel primary filter coarser in pore size is unlikely clogged, and the fuel primary filter and the fuel secondary filter are restrained from constituting resistance against the flow of the fuel, so that an inexpensive fuel pump can be adopted.

Therefore, the replacement cycle times for the fuel primary filter and the fuel secondary filter can be prolonged, and the numbers of times of maintenance of the filters can be reduced. In addition, the flow rate of the fuel passed through the fuel primary filter and the fuel secondary filter can be maintained at a favorable level for a long time, and it is possible to sufficiently cope with an abrupt increased in the fuel flow rate required.

Further, since the fuel secondary filter is finer than the fuel primary filter in pore size, even in the case where a fuel accompanied by fine dust mixed therein such as ethanol is used, the fine dust can be caught by the fuel secondary filter finer in pore size. On the other hand, since the fuel secondary filter is set finer than the fuel primary filter in pore size so as to enable a fuel accompanied by fine dust mixed therein such as ethanol to be used, the replacement cycle time of the fuel secondary filter is shorter than that of the fuel primary filter. Since the luggage box is dismountably mounted, however, a space is formed on the front side of the fuel secondary filter upon dismounting of the luggage box.

In this case, since the fuel secondary filter is locked onto the rear fender, the operations of mounting and dismounting the fuel secondary filter are easy to carry out. In addition, since the fuel secondary filter is disposed along the inclination of the front portion of the rear fender, the operations of mounting and dismounting the fuel secondary filter onto and from the rear fender in vertical directions are easy to carry out.

According to another aspect of the disclosure, the luggage box has a capacity sufficient for accommodating a rider's helmet. Therefore, a large space can be formed on the front side of the fuel secondary filter, so that replacement of the fuel secondary filter can be facilitated.

According to another aspect of the disclosure, the fuel supply path is provided, on the downstream side of the fuel secondary filter, with a pressure regulator by which part of the fuel is returned to the fuel tank side when the fuel pressure in the fuel supply path between the injector and the fuel pump is increased to reach a predetermined pressure, and the injector and the pressure regulator are disposed on the front side of the luggage box. Therefore, a large capacity of the luggage box can be secured, since the arrangement of the pressure regulator on the front side of the luggage box does not impose a restriction on the capacity of the luggage box. Besides, the pressure regulator can be disposed close to the injector, so that pulsation of the fuel can be restrained.

According to another aspect of the disclosure, the fuel filter is disposed between a rear wall of the luggage box and a front wall of the fuel tank. Therefore, the fuel filter can be disposed while effectively utilizing a dead space formed between the rear wall of the luggage box and the front wall of the fuel tank. Accordingly, the fuel filter can be disposed while securing the capacity of the luggage box in the vertical direction.

According to another aspect of the disclosure, a cross pipe is disposed between the rear wall of the luggage box and the front wall of the fuel tank, the cross pipe extends in the vehicle width direction to interconnect a pair of the left and right frame members, and the fuel filter is dismountably supported on the cross pipe and has its longitudinal direction disposed along the cross pipe. Therefore, the luggage box and the fuel tank can be disposed close to each other, whereby the front-rear length of the vehicle can be shortened.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
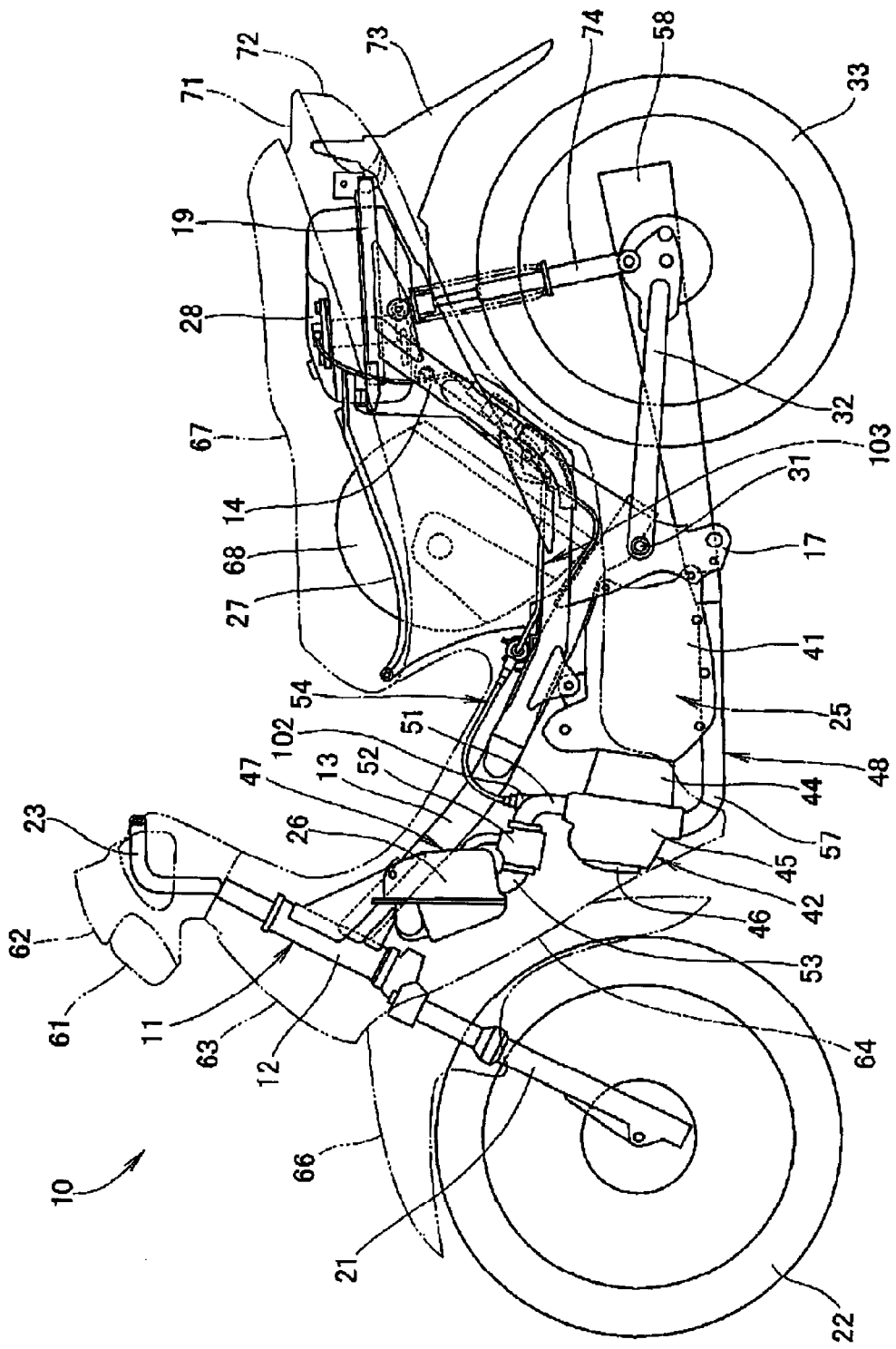
FIG. 1 is a side view of a motorcycle pertaining to the present invention (Example 1)

Now, embodiments of the present application will be described below, based on the accompanying drawings. Incidentally, left, right, front and rear in the following description refer to those sides (directions) with reference to a driver seated on the vehicle. Besides, the drawings are to be viewed according to the posture of reference symbols, and arrow (FRONT) in the drawings indicates the front side (forward direction) of the vehicle.

EXAMPLE 1

Now, Example 1 of the present application will be described.

As shown in FIG. 1, a motorcycle 10 has a body frame 11 serving as a skeleton of the motorcycle 10. The body frame 11 includes: a head pipe 12 constituting a front end portion; a single main frame 13 extending rearwardly downward from the head pipe 12; a pair of left and right rear frames 14 and 16 (only symbol 14 on the viewer's side is shown) extending rearward from left and right parts of an intermediate portion of the main frame 13 and then extending rearwardly upward; and a pair of left and right pivot plates 17 and 18 (only symbol 17 on the viewer's side is shown) attached to left and right parts of a rear end portion of the main frame 13.

The rear frames 14 and 16 are attached also to the pivot plates 17 and 18, and are provided at their rear end portion with rear-end extension portions 19 formed to be substantially horizontal.

A front fork 21 is steerably mounted to the head pipe 12, a front wheel 22 is mounted to the lower ends of the front fork 21, and a bar handle 23 is attached to the upper end of the front fork 21.

An upper portion of an engine 25 is mounted to a rear portion of the main frame 13, and an air cleaner 26 is mounted to a front portion of the main frame 13.

The rear frames 14 and 16 support a lower portion of a luggage box 27 by their front portions and intermediate portions, and support a rear end portion of the luggage box 27 and the fuel tank 28 by their rear portions, specifically, their rear-end extension portions 19.

A rear end portion of the engine 25 is mounted to front portions of the pivot plates 17 and 18, and a swing arm 32 is vertically swingably mounted to central portions of the pivot plates 17 and 18 through a pivot shaft 31.

A rear wheel 33 is mounted to a rear end portion of the swing arm 32.

The engine 25 includes a crankcase 41, and a cylinder section 42 mounted to a front end portion of the crankcase 41 so as to extend forward, and a transmission is provided inside the crankcase 41.

The cylinder section 42 includes a cylinder block 44 mounted to the crankcase 41, a cylinder head 45 attached to the cylinder block 44, and a head cover 46 covering an opening part of the cylinder head 45.

An intake system 47 and an exhaust system 48 are connected respectively to an upper portion and a lower portion of the cylinder head 45.

The intake system 47 includes an intake pipe 51 connected to the upper portion of the cylinder head 45, a throttle body 52 connected to the intake pipe 51, and the air cleaner 26 connected to the throttle body 52 through a connecting tube 53.

A fuel supply system 54 supplied with the fuel from the fuel tank 28 is connected to the intake pipe 51.

The exhaust system 48 includes an exhaust pipe 57 connected to the lower portion of the cylinder head 45, and a muffler 58 connected to the rear end of the exhaust pipe 57.

Symbol 61 in the figure denotes a head lamp, 62 denotes a handle cover, 63 denotes a front cover, 64 denotes a leg shield, 66 denotes a front fender, 67 denotes a seat, 68 denotes a rider's helmet, 71 denotes a rear cover, 72 denotes a tail lamp, 73 denotes a rear fender, and 74 denotes a rear cushion unit.

Figure 2:
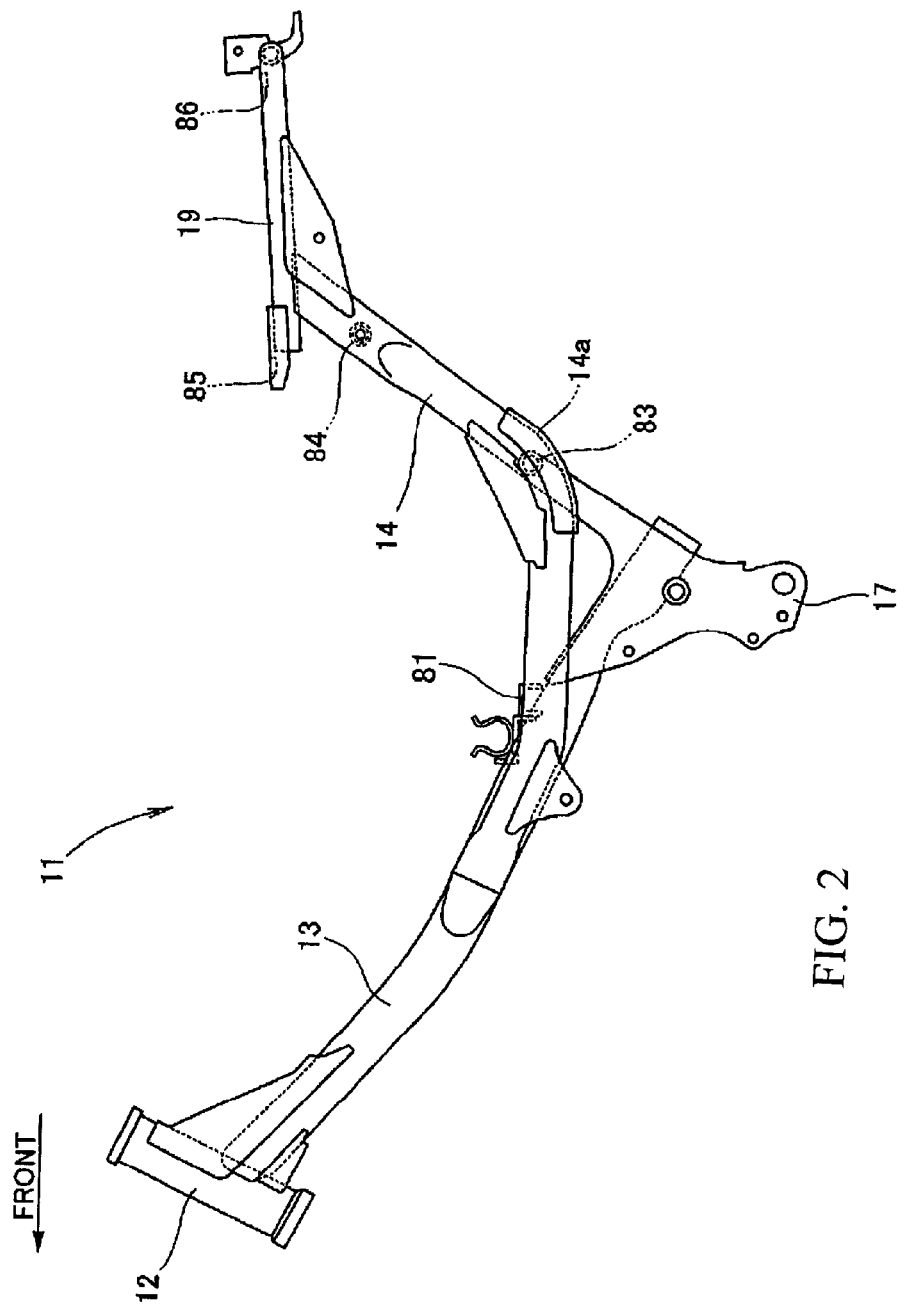
FIG. 2 is a side view of a body frame of the motorcycle pertaining to the invention (Example 1)

As shown in FIG. 2, a cross member 81 having an angular U-shaped section and extending in the vehicle width direction is bridgingly disposed between front portions of the rear frames 14 and 16 (only symbol 14 on the viewer's side is shown) of the body frame 11. A pipe-shaped first cross pipe 83 extending in the vehicle width direction is bridgingly disposed between intermediate portions, specifically bent portions 14a and 16a (only symbol 14a on the viewer's side is shown) of the rear frames 14 and 16. A pipe-shaped second cross pipe 84 extending in the vehicle width direction is bridgingly disposed between rear portions of the rear frames 14 and 16.

The cross member 81 supports a bottom portion of the luggage box 27 (see FIG. 1), and rear end portions of the left and right pivot plates 17 and 18 (only symbol 17 on the viewer's side is shown) are attached to the first cross pipe 83. Therefore, the rear frames 14, 16 and the pivot plates 17, 18 are connected to each other through the first cross pipe 83.

The rear-end extension portions 19 of the rear frames 14 and 16 are fitted with left-right pairs of nuts 85, 85 (only symbol 85 on one side is shown) and nuts 86, 86 (only symbol 86 on one side is shown) at their front end portions and rear end portions. The luggage box 27 and the fuel tank 28 (see FIG. 1) are mounted to the rear-end extension portions 19 by the nuts 85, 86 and bolts (not shown).

Figure 3:
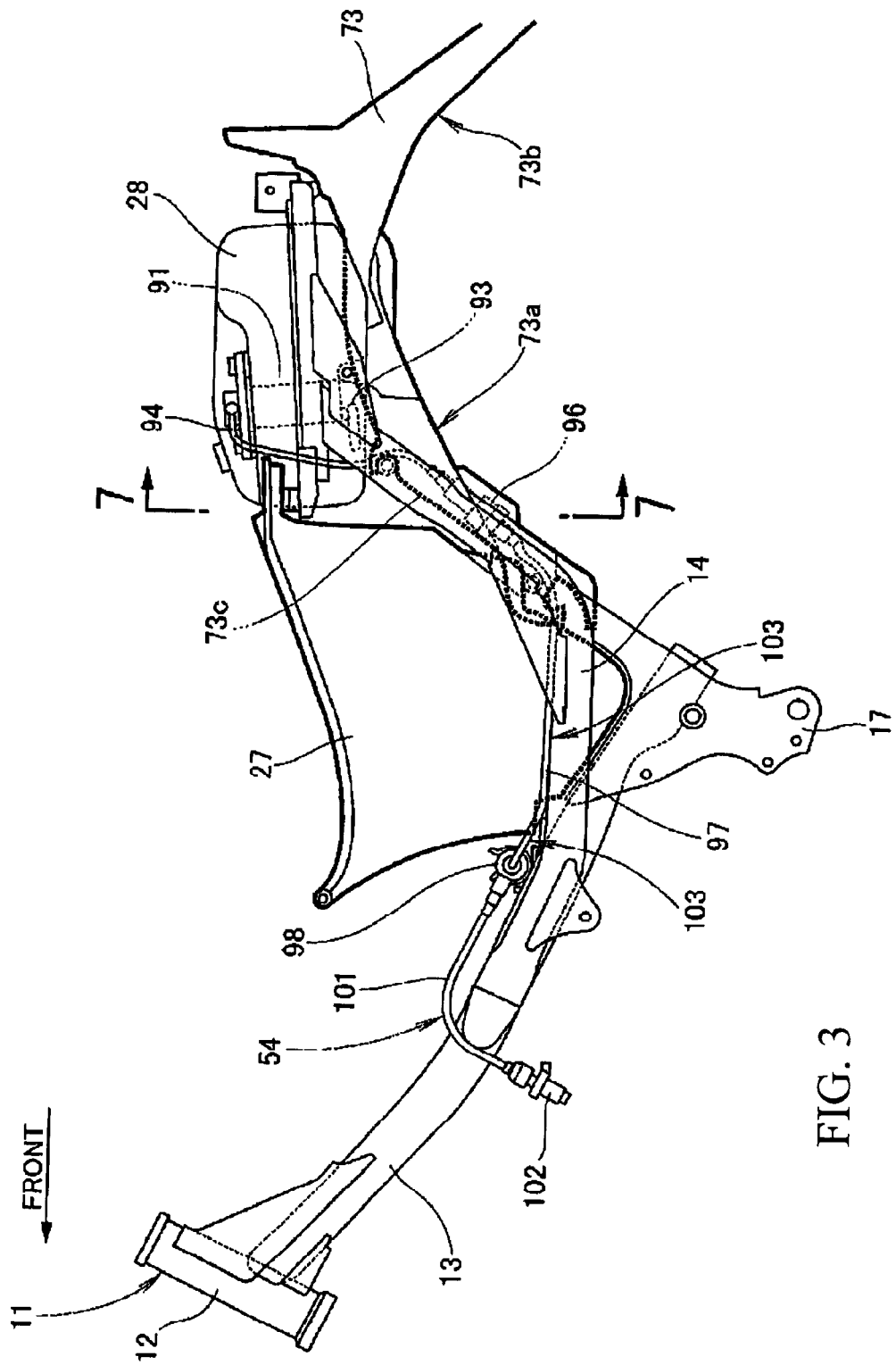
FIG. 3 is a side view showing a luggage box, a fuel supply system and a rear fender disposed on the body frame pertaining to the invention (Example 1)

In FIG. 3, for easy grasping of the shapes of the luggage box 27 and the rear fender 73, the outlines of the luggage box 27 and the rear fender 73 are indicated by thick lines.

As shown in FIG. 3, the fuel supply system 54 includes the fuel tank 28, a fuel pump 91 attached to an upper portion of the fuel tank 28, a fuel primary filter 93 annexed to the fuel pump 91, a fuel secondary filter 96 connected to the fuel primary filter 93 through a fuel pipe 94, a pressure regulator 98 connected to the fuel secondary filter 96 through a fuel pipe 97, an injector 102 connected to the pressure regulator 98 through a fuel pipe 101, and a return pipe 118 (see FIG. 6) for connecting the pressure regulator 98 and the fuel tank 28. The injector 102 is attached to the intake pipe 51 (see FIG. 1) of the intake system 47 (see FIG. 1).

Other than the return pipe, the fuel supply system 54 is provided with a fuel supply path 103 for supplying the fuel from the fuel tank 28 to the intake pipe 51 on the side of the engine 25 (see FIG. 1).

Figure 4:
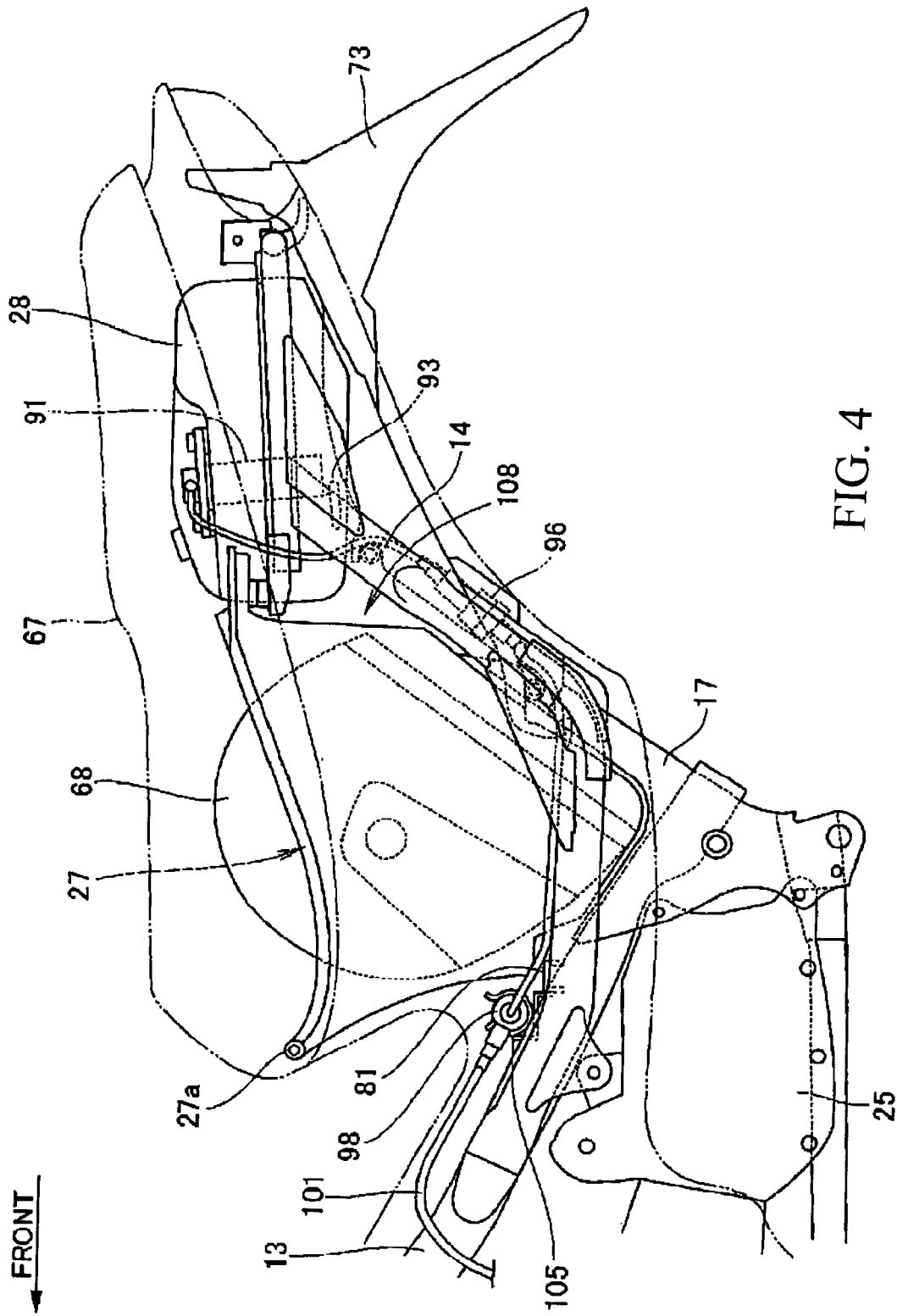
FIG. 4 is a side view of a major part of the motorcycle pertaining to the invention (Example 1)

As shown in FIG. 4, the luggage box 27 is formed in a large size so that a full-face type helmet 68 can be accommodated therein. Incidentally, symbol 27a denotes a seat attaching part provided at a front end portion of the luggage box 27 so as to attach the seat 67 to the luggage box 27 in an openable and closable manner.

The fuel secondary filter 96 is detachably attached to an upper surface of the rear fender 73, and is disposed between the luggage box 27 and the rear fender 73 and between the left and right rear frames 14 and 16 (only symbol 14 on the viewer's side is shown).

The pressure regulator 98 is detachably held by a regulator bracket 105 attached to a front portion of the cross member 81, and is disposed on the front side of the luggage box 27 and above the main frame 13, front portions of the rear frames 14 and 16, and the cross member 81.

Figure 5:
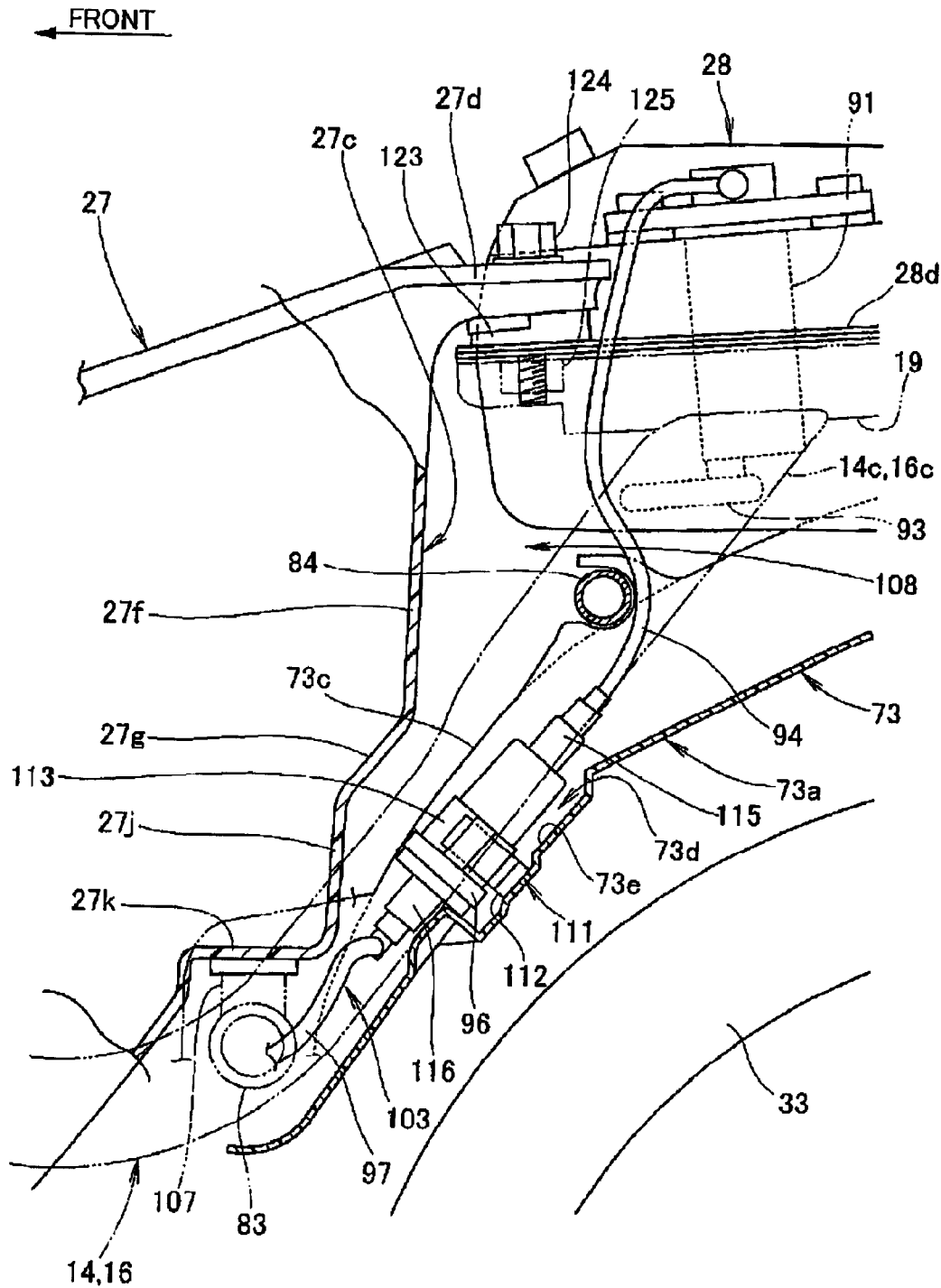
FIG. 5 is a sectional view showing a layout structure of a fuel filter pertaining to the invention (Example 1)

As shown in FIG. 5, a rear wall 27c of the luggage box 27 includes a pair of left and right upper attaching parts 27d and 27e (only symbol 27d on the viewer's side is shown) formed to project rearward so as to be attached to the rear-end extension portions 19, an upper vertical wall part 27f extending downward from the side of the upper attaching parts 27d and 27e, an upper slant wall part 27g extending forwardly downward from the lower end of the upper vertical wall part 27f, a lower vertical wall part 27j extending downward from the upper slant wall part 27g, and a lower support part 27k extending forward from the lower vertical wall part 27j so as to be supported by the first cross pipe 83 through a rubber 107.

The upper vertical wall part 27f, the upper slant wall part 27g and the lower vertical wall part 27j of the rear wall 27c as above-mentioned are, as a whole, inclined so that the upper vertical wall part 27f side is located on the rear side relative to the lower vertical wall part 27j side.

As shown in FIG. 3, the rear fender 73 is formed in an upwardly protuberant arched shape for covering the front side, the upper side and the rear side of the rear wheel 33 (see FIG. 1), and has a front portion 73a and a rear portion 73b formed respectively on the front and rear sides of an uppermost portion of the circular arch. Besides, a protuberant portion 73c which is projected to the radially outer side is formed over the range from the front portion 73a to the rear portion 73b, so as to avoid interference with the rear wheel 33.

Returning to FIG. 5, the front portion 73a of the rear fender 73 is disposed so as to face the rear wall 27c of the luggage box 27, and is so formed that the distance thereto from the rear wall 27c increases along the upward direction. Therefore, the space 108 formed between the rear wall 27c of the luggage box 27 and the front portion 73a of the rear fender 73 is gradually increased in size in front-rear direction along the upward direction.

The front portion 73a of the rear fender 73 is provided with a recessed portion 73d recessed toward the side of the rear wheel 33, at a position facing the rear wall 27c, specifically, the upper slant wall part 27g, of the luggage box 27. Part of the fuel secondary filter 96 is accommodated in the recessed portion 73d.

The fuel secondary filter 96 is dismountably held on a bottom portion 73e of the recessed portion 73d through a holder 111, and is so disposed as to be inclined forwardly downward along the rear frames 14, 16, specifically, rear slant parts 14c, 16c of the rear frames 14, 16, and the protuberant portion 73c of the rear fender 73. Incidentally, symbols 115 and 116 denote connectors which are provided at respective end portions of the fuel pipes 94 and 97 and connected to the fuel secondary filter 96.

The holder 111 includes an angular U-shaped holding member 112 attached to the bottom portion 73e, and a rubber-made fastening member 113 provided with hole portions in which to press fit two end portions of the holding member 112. The fastening member 113 is fitted onto an outer peripheral portion of the fuel secondary filter 96.

Figure 6:
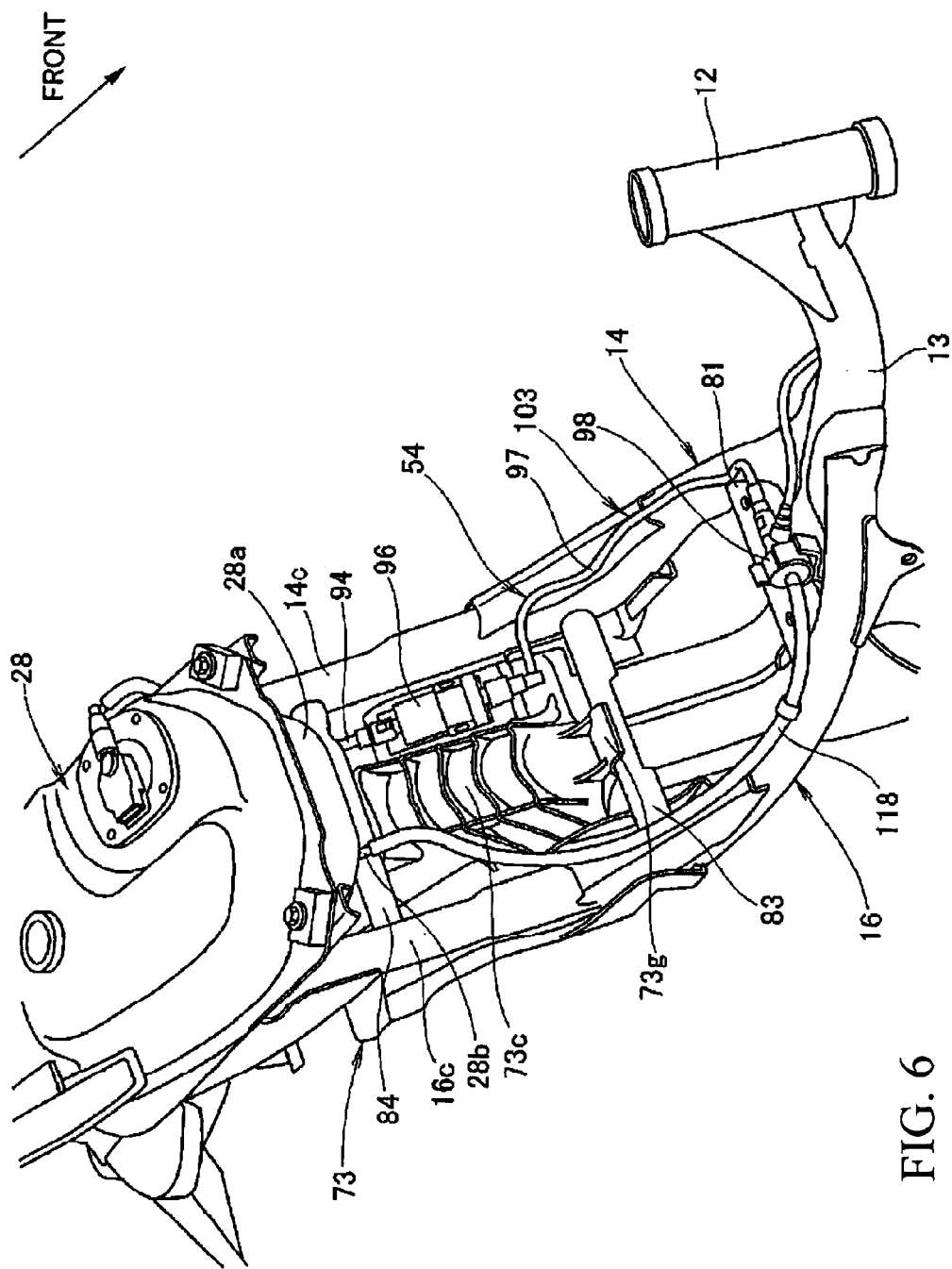
FIG. 6 is a perspective view of the motorcycle, showing the fuel supply system pertaining to the invention (Example 1)

As shown in FIG. 6, the fuel secondary filter 96 is so disposed that its longitudinal direction is set along the rear slant parts 14c, 16c of the rear frames 14, 16 and the protuberant portion 73c of the rear fender 73.

The fuel supply system 54 has a return pipe 118 which is connected at its one end to the pressure regulator 98, and at its other end to a return port 28b provided in a bottom portion 28a of the fuel tank 28.

Figure 7:
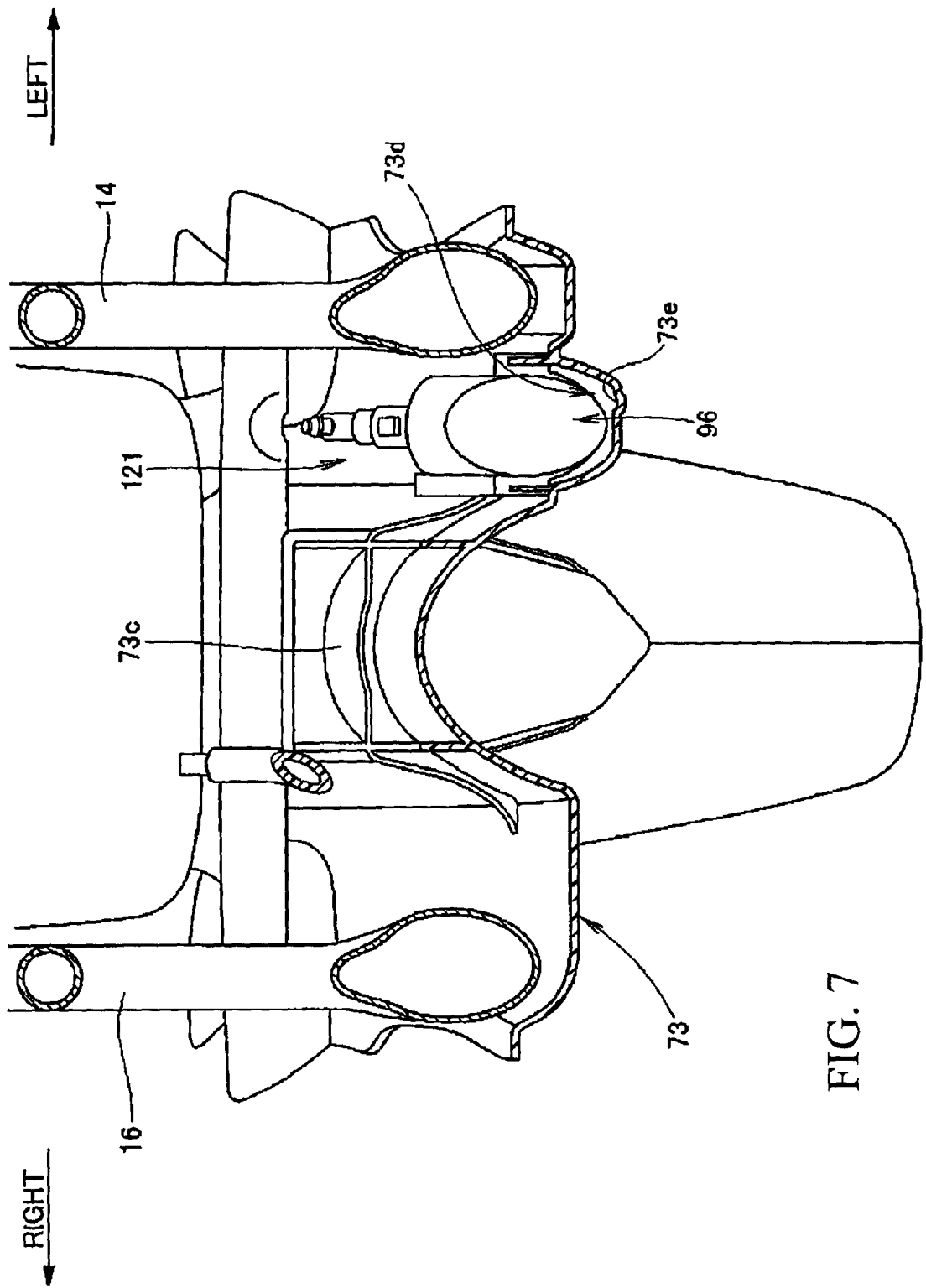
FIG. 7 is a sectional view taken along line 7-7 of FIG. 3 (Example 1)

In FIG. 7, arrow (LEFT) indicates the left side of the vehicle body, and arrow (RIGHT) indicates the right side of the vehicle body.

As shown in FIG. 7, the fuel secondary filter 96 is disposed on the left side of the protuberant portion 73c of the rear fender 73 and between the rear frames 14 and 16; in other words, the fuel secondary filter 96 is disposed between the protuberant portion 73c and the rear frame 14 on one side.

Of the space 108 formed between the rear wall 27c of the luggage box 27 and the front portion 73a of the rear fender 73 shown in FIG. 5, particularly the space 121 between the protuberant portion 73c and the rear frame 14 is a space which has not hitherto been used. By disposing the fuel secondary filter 96 in such a space 121, the space 121 can be utilized effectively, whereby an increase in the size of the vehicle body can be suppressed, as compared with the case where the vehicle body is especially provided with a space for disposing the fuel secondary filter 96.

In addition, since the fuel secondary filter 96 is disposed between the protuberant portion 73c and the rear fender 14 and along the protuberant portion 73c and the rear frame 14, the fuel secondary filter 96 can be easily disposed even if the space 121 is small in width; accordingly, the space 121 can be utilized more effectively.

Figure 8:
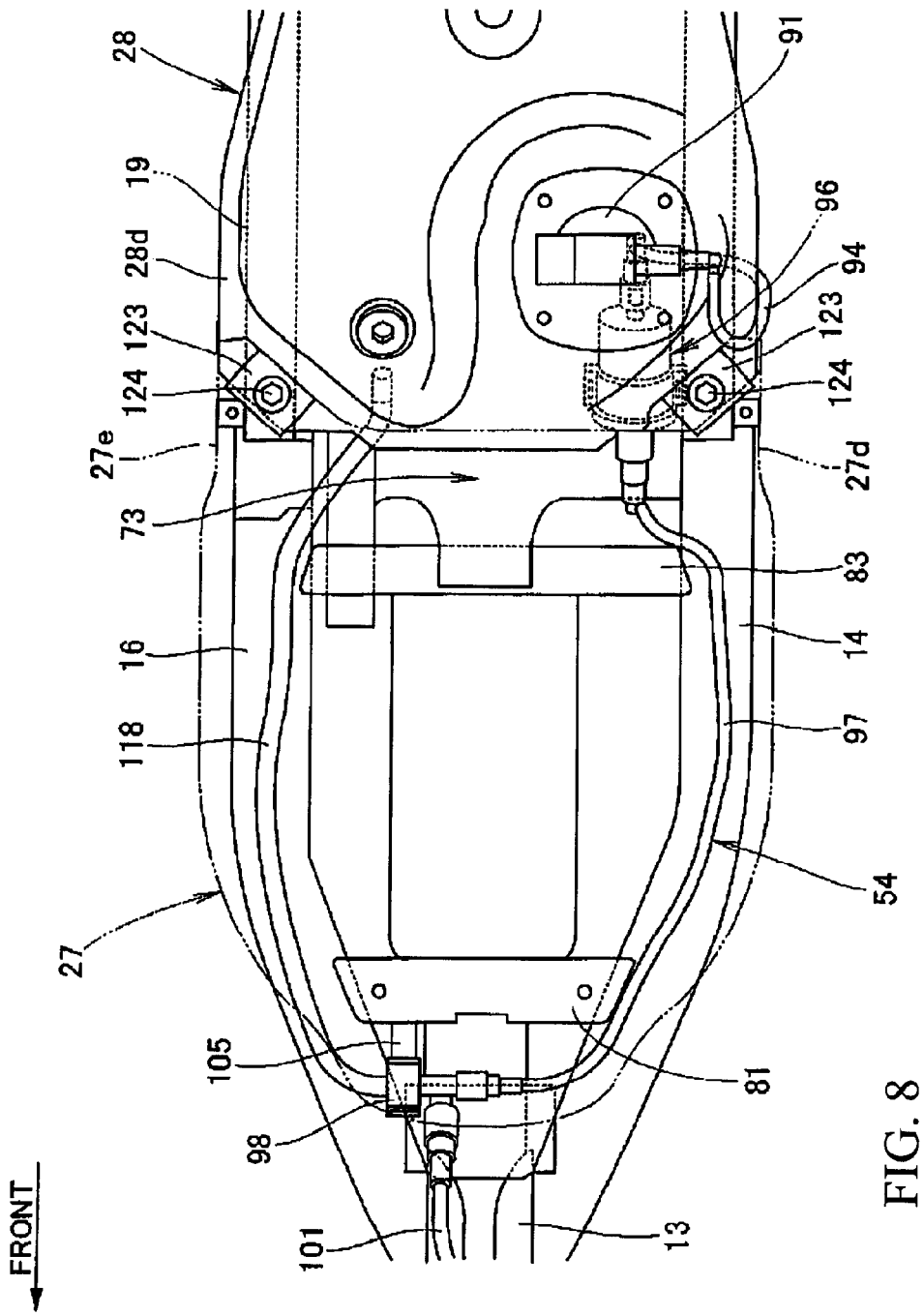
FIG. 8 is a plan view of a major part of the motorcycle pertaining to the invention (Example 1)

As shown in FIG. 8, the upper attaching parts 27d, 27e of the luggage box 27 and a flange portion 28d of the fuel tank 28 are co-fastened by bolts 124 to front end portions at both sides of the rear-end extension portions 19 of the rear frames 14, 16, in the condition where a mount rubber 123 is placed between each of the upper attaching parts 27d, 27e and the flange portion 28d.

More specifically, in FIG. 5, the flange portion 28d of the fuel tank 28, the mount rubber 123 and the upper attaching part 27d of the luggage box 27 in this order are mounted on the rear-end extension portions 19 of the rear frames 14, 16, then the bolt 124 is set to penetrate the upper attaching part 27d, the mount rubber 123, the flange portion 28d and the rear-end extension portion 19, and is put into screw engagement with a nut 125 attached to the rear-end extension portion 19.

Similarly, the flange portion 28d, the mount rubber 123 and the upper attaching part 27e (see FIG. 8) of the luggage box 27 in this order are mounted on the rear-end extension portions 19 of the rear frames 14, 16, then the bolt 124 is set to penetrate the upper attaching part 27e, the mount rubber 123, the flange portion 28d and the rear-end extension portion 19, and is put into screw engagement with a nut 125 attached to the rear-end extension portion 19.

In addition, as shown in FIG. 8, the fuel pipe 97 constituting the fuel supply system 54 is disposed along and on the upper side of the rear frame 14 on one side to extend from the fuel secondary filter 96 to the pressure regulator 98, whereas the return pipe 118 is disposed along and on the upper side of the rear frame 16 on the other side to extend from the pressure regulator 98 to a lower portion of the fuel tank 28.

Figure 9:
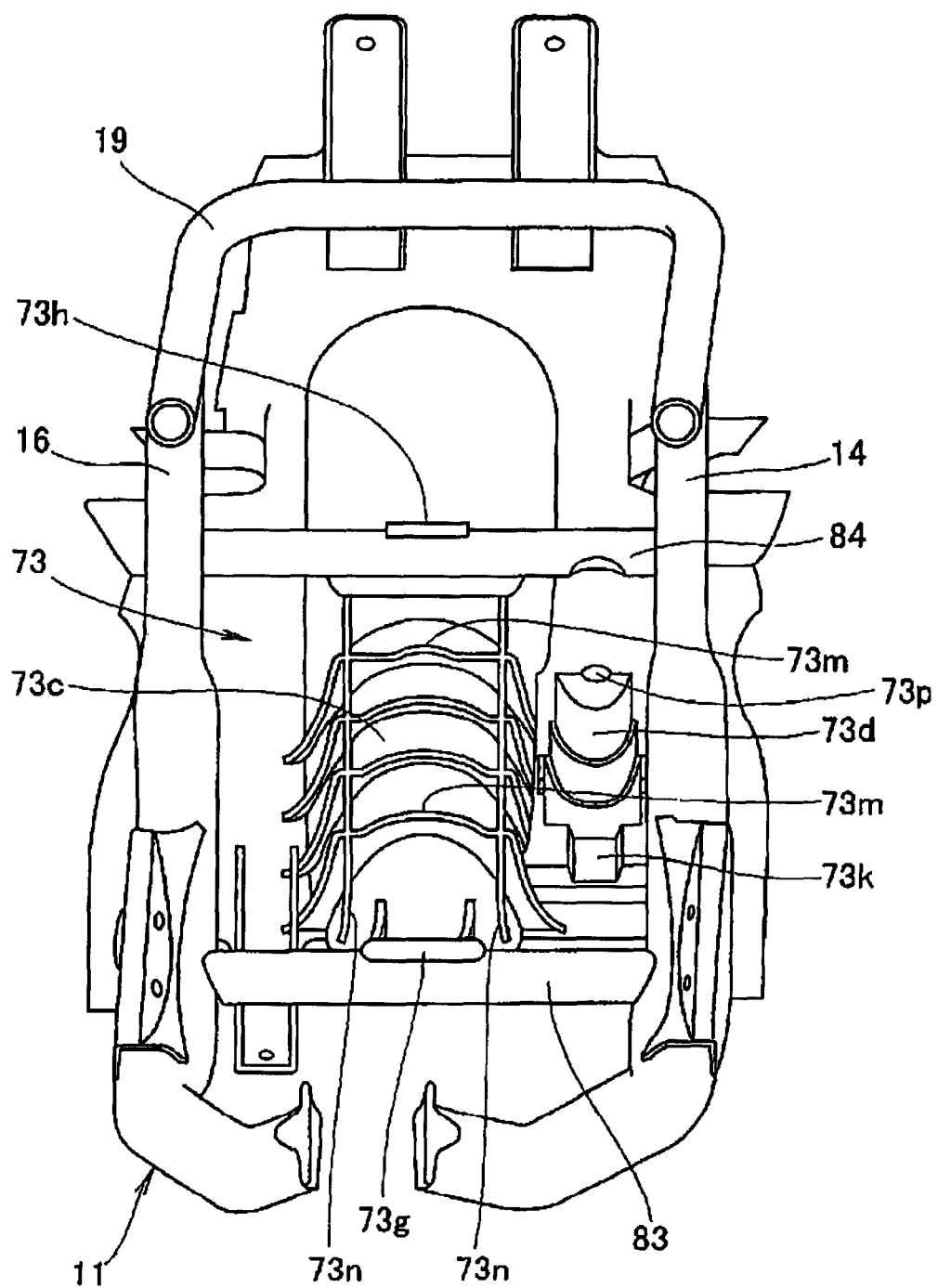
FIG. 9 is a perspective view showing a fuel filter accommodating recessed portion of the rear fender pertaining to the invention (Example 1)

As shown in FIG. 9, of the rear fender 73, a front-side lock part 73g and a rear-side lock part 73h each provided at a central portion in the vehicle width direction are locked respectively on the first cross pipe 83 and the second cross pipe 84 of the body frame 11.

The recessed portion 73d of the rear fender 73 is so formed that its longitudinal direction is set along the protuberant portion 73c. On the front side of the recessed portion 73d, a groove portion 73k is formed for avoiding interference with the connector 116 (see FIG. 5) connected to the fuel secondary filter 96 (see FIG. 8) from the front side. Besides, on the rear side of the recessed portion 73d, a groove portion 73p is formed for avoiding interference with the connector 115 (see FIG. 5) connected to the fuel secondary filter 96 (see FIG. 8) from the rear side. Incidentally, each symbol 73m denotes a transverse rib formed for reinforcing the protuberant portion 73c, and each symbol 73n denotes a longitudinal rib formed for reinforcing the protuberant portion 73c.

Figure 10:
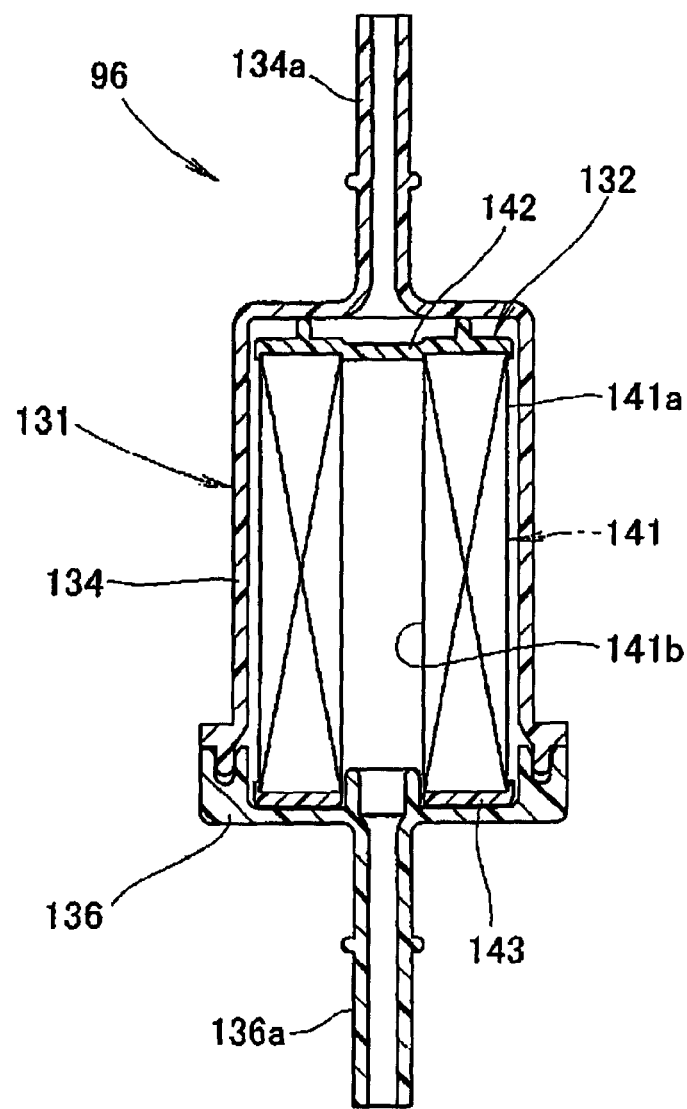
FIG. 10 is a sectional view of a fuel secondary filter pertaining to the invention (Example 1)

As shown in FIG. 10, the fuel secondary filter 96 includes a filter case 131, and a filter assembly 132 accommodated in the filter case 131.

The filter case 131 includes a bottomed cylindrical case body 134, and a case cover 136 closing an opening portion of the case body 134.

The case body 134 is provided with a fuel suction port 134a which is connected to the fuel pipe 94 (see FIG. 5) on the side of the fuel tank 28 (see FIG. 5) and through which the fuel is sucked in, whereas the case cover 136 is provided with a fuel discharge port 136a which is connected to the fuel pipe 97 (see FIG. 5) on the side of the injector 102 (see FIG. 3) and through which the fuel is discharged.

The filter assembly 132 includes a cylindrical filter 141 formed from filter paper, and a frame bodies 142, 143 for supporting both ends of the filter 141. The filter assembly 132 is fixed by being clamped between the case body 134 and the case cover 136.

The fuel is sucked through the fuel suction port 134a into the filter case 131, is filtered while flowing through the filter 141 from an outer peripheral surface 141a to an inner peripheral surface 141b of the filter 141, and is then discharged through the fuel discharge port 136a to the outside of the filter face 131.

Figure 11:
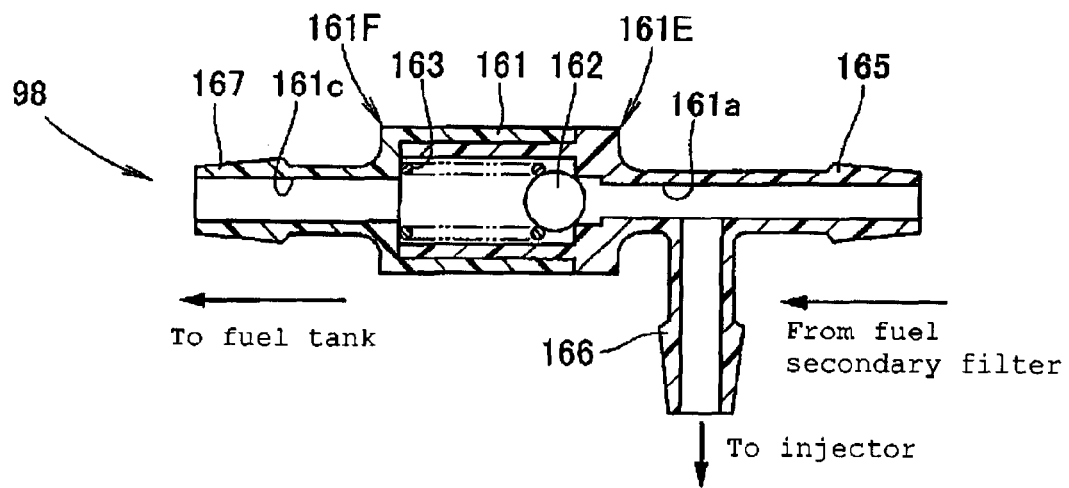
FIG. 11 is a sectional view of a pressure regulator pertaining to the invention (Example 1)

As shown in FIG. 11, the pressure regulator 98 includes a case 161 having a resin-made first case 161E and a resin-made second case 161F joined to each other, a steel-made spherical valve element 162 for opening and closing a passage hole 161a formed at a bottom on one end side of the case 161, a compression coil spring 163 biasing the valve element 162 in the direction for closing the passage hole 161a, a fuel suction port 165 in which the passage hole 161a is bored, a fuel discharge port 166 formed in the course of the fuel suction port 165, and a fuel return port 167 in which a passage hole 161c formed at a bottom on the other side of the case 161 is bored.

The fuel suction port 165 is connected to the fuel secondary filter 96 (see FIG. 6), whereas the fuel discharge port 166 is connected to the injector 102 (see FIG. 3), and the fuel return port 167 is connected to the fuel tank 28 (see FIG. 6).

Figure 12:
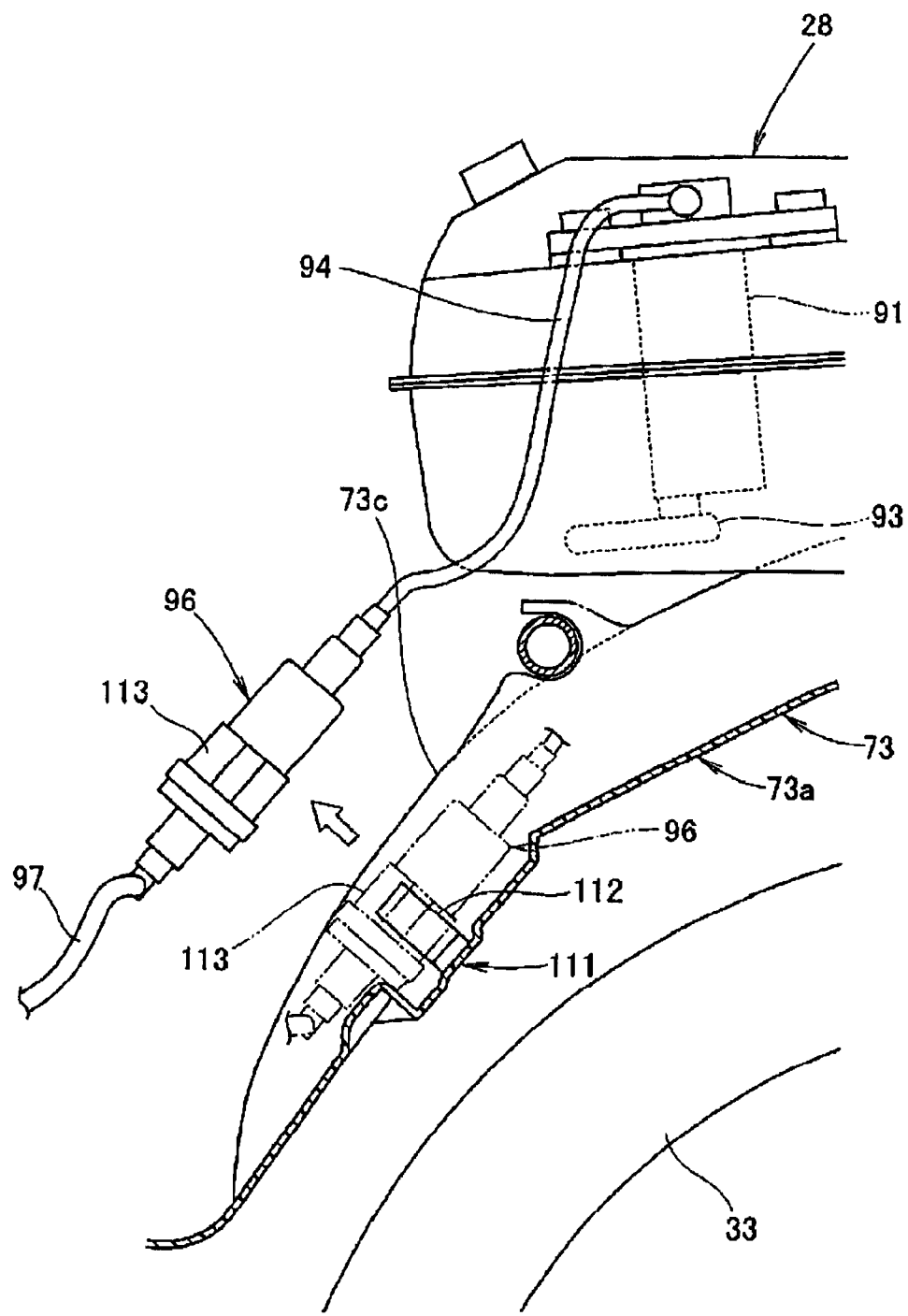
FIG. 12 is a working view showing a working of the fuel secondary filter pertaining to the invention (Example 1)

As shown in FIG. 12, the fuel secondary filter 96 is detachably attached to the rear fender 73. Therefore, for example, in the case of performing maintenance of the fuel secondary filter 96, first, the luggage box 27 is dismounted from the vehicle. Then, as indicated by void arrow, the fuel secondary filter 96 is pulled forwardly upward so as to release the fitting between the holding member 112 on the rear fender 73 side and the fastening member 113 on the fuel secondary filter 96 side, whereby the fuel secondary filter 96 is detached from the rear fender 73.

In the case of attaching the fuel secondary filter 96 to the rear fender 73, contrary to the above-mentioned, the fuel secondary filter 96 is moved rearwardly downward so as to press the fastening member 113 on the fuel secondary filter 96 side against the holding member 112 on the rear fender 73 side, and to fit the fastening member 113 to the holding member 112.

EXAMPLE 2

Example 2 of the present invention will now be described. Incidentally, the same configurations as those shown in Example 1 above are denoted by the same symbols as used above, and detailed descriptions of them will be omitted.

Figure 13:
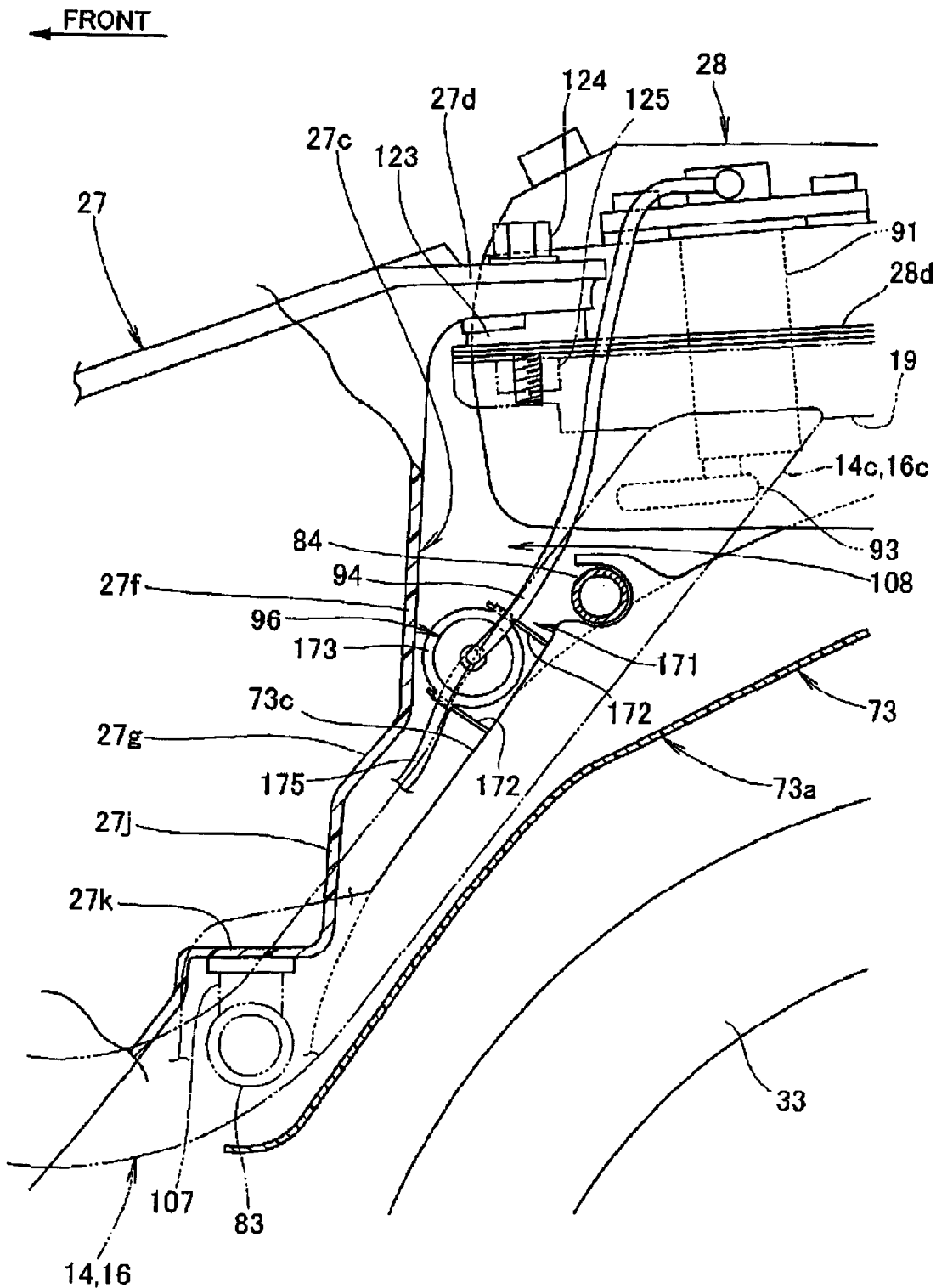
FIG. 13 is a sectional view showing a layout structure of the fuel secondary filter pertaining to the invention (Example 2)

As shown in FIG. 13, a fuel secondary filter 96 is disposed in a space 108 formed between a rear wall 27c (specifically, an upper vertical wall portion 27f) of a luggage box 27 and a front portion 73a of a rear fender 73, in such a manner that its longitudinal direction extends along the vehicle width direction.

A holder 171 for holding the fuel secondary filter 96 on the rear fender 73 includes holding members 172, 172 provided on a protuberant portion 73c, and a rubber-made fastening member 173 which is provided with a pair of hole portions for press fitting the holding members 172, 172 therein and which is fitted onto an outer peripheral portion of the fuel secondary filter 96.

A fuel pipe 94 is connected to a suction side of the fuel secondary filter 96, and a fuel pipe 175 is connected to a discharge side of the fuel secondary filter 96.

Figure 14:
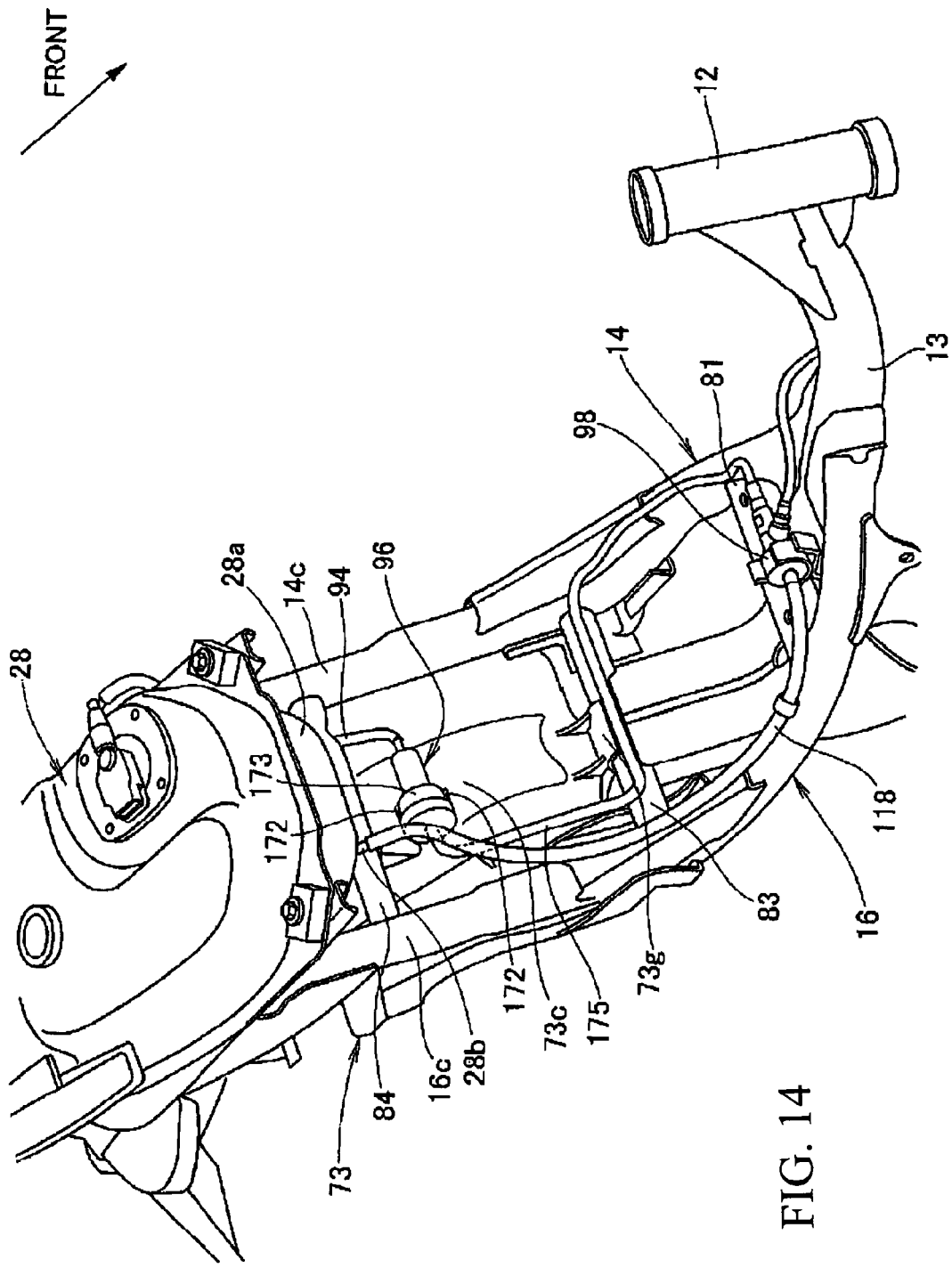
FIG. 14 is a perspective view of a motorcycle, showing a fuel supply system pertaining to the invention (Example 2)

As shown in FIG. 14, the fuel pipe 175 connected to the discharge side of the fuel secondary filter 96 extends from the fuel secondary filter 96 rightward along the vehicle width direction, is then immediately turned under a return pipe 118 toward a front lower side, extends downward along a rear frame 16, further extends leftward in the vehicle width direction along a first cross pipe 83, then extends forward along a rear frame 14, and is thereafter connected to a pressure regulator 98.

Figure 15:
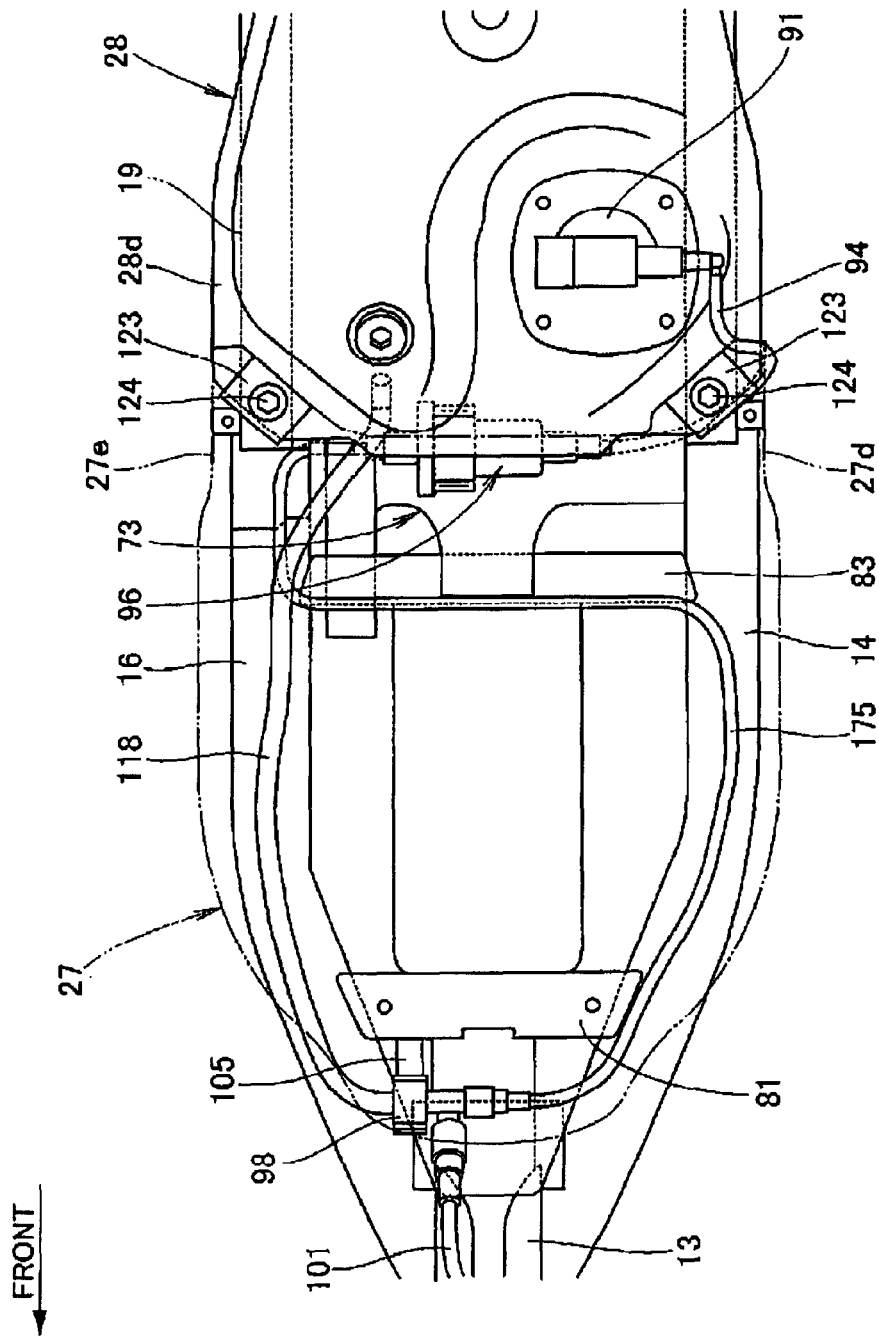
FIG. 15 is a plan view of a major part of the motorcycle pertaining to the invention (Example 2)

As shown in FIG. 15, the fuel pipe 175 is laid out in a U shape from the discharge side of the fuel secondary filter 96 (which is disposed to extend in the vehicle width direction) to the rear fender 73, then to the rear frame 16 and along the first cross member 83, further extends forward along the rear frame 14, and is connected to the pressure regulator 98.

As has been shown in FIGS. 1 and 5 above, a motorcycle 10 includes: a single main frame 13 extending rearwardly downward from a head pipe 12; a pair of left and right rear frames 14, 16 extending rearwardly upward from the main frame 13; the luggage box 27 disposed on the front side of a rear wheel 33 and on the upper side of the rear frames 14, 16; a fuel tank 28 disposed on the upper side of the rear wheel 33 and on the rear side of the luggage box 27; the rear fender 73 provided between the left and right rear frames 14, 16, disposed between the luggage box 27 and the rear wheel 33, and covering the rear wheel 33 on the front and upper sides of the rear wheel 33; a fuel supply path 103 for supplying a fuel in the fuel tank 28 to the side of an engine 25; and a fuel filter disposed in the course of the fuel supply path 103. In the motorcycle 10, the rear fender 73 is so disposed that its front portion 73a faces the rear wall 27c of the luggage box 27, the front portion 73a is inclined rearwardly upward so that the distance thereto from the rear wall 27c increases along an upward direction, and a fuel secondary filter 96 as the fuel filter is disposed between the rear wall 27c of the luggage box 27 and the front portion 73a of the rear fender 73.

This constitution makes it possible to dispose the fuel secondary filter 96 while utilizing effectively a space 108 formed between the front portion 73a of the rear fender 73, inclined rearwardly upward so that the distance thereto from the rear wall 27c increases along an upward direction, and the rear wall 27c of the luggage box 27; as a result, the fuel secondary filter 96 can be disposed while securing a large capacity of the luggage box 27.

In addition, since the front portion 73a of the rear fender 73 is inclined rearwardly upward so that the distance thereto from the rear wall 27c increases along the upward direction, the space 108 formed between the front portion 73a of the rear fender 73 and the luggage box 27 is enlarged along the upward direction. Accordingly, a large type fuel secondary filter 96 can be arranged in the space 108.

An increase in the size of the fuel secondary filter 96 makes it possible to reduce the frequency of replacement of the fuel secondary filter 96 and to permits easier attenuation of pulsation of the fuel.

As shown in FIGS. 5 and 7 above, the rear fender 73 is provided with a protuberant portion 73c which is projected toward the rear wall 27c of the luggage box 27 for avoiding interference with a rear wheel 33 upon a maximum stroke of the rear wheel 33, the rear frames 14 and 16 are disposed respectively on the left and right sides of the protuberant portion 73c, and the fuel secondary filter 96 is disposed between the protuberant portion 73c and the rear frame 14. Therefore, the protuberant portion 73c provided as part of the rear fender 73 can be disposed closer to the rear wall 27c of the luggage box 27 and, hence, the motorcycle 10 can be made smaller in size, as compared with the case where the fuel secondary filter 96 is disposed between the protuberant portion 73c and the rear wall 27c of the luggage box 27.

As shown in FIGS. 5 and 6 above, the fuel secondary filter 96 has its longitudinal direction set along the extending direction of the rear frames 14, 16, together with the protuberant portion 73c. Therefore, the protuberant portion 73c, the fuel secondary filter 96 and the rear frames 14, 16 can be disposed close to one another in the vehicle width direction. Consequently, a smaller vehicle width can be realized.

Besides, the rear fender 73 is provided between the protuberant portion 73c and the rear frame 14, 16 with a recessed portion 73d which is recessed toward the rear wheel 33 and which accommodates at least a part of the fuel secondary filter 96. Therefore, the space 108 formed between the front portion 73a of the rear fender 73 and the rear wall 27c of the luggage box 27 can be enlarged by the recessed portion 73d, which permits a larger type fuel secondary filter 96 to be disposed in the space 108.

As shown in FIGS. 3, 8 and 10 above, a fuel pump 91, an injector 102 for injecting the fuel to the engine 25 side (see FIG. 1), and a fuel primary filter 93 disposed on the upstream side of the fuel pump 91 are provided in the fuel supply path 103. The fuel filter is the fuel secondary filter 96 disposed on the downstream side of the fuel pump 91 and the fuel primary filter 93. The fuel secondary filter 96 is set to be finer in pore size than the fuel primary filter 93, and is locked onto the rear fender 73 in the state of being along the inclination of the front portion 73a of the rear fender 73. The luggage box 27 is dismountably mounted to the rear frames 14, 16 and the fuel tank 28.

This configuration ensures that large dust can be trapped by the fuel primary filter 93, and fine dust having passed through the fuel primary filter 93 can be trapped by the fuel secondary filter 96. Therefore, large dust is unlikely trapped by the fuel secondary filter 96, so that possibility of clogging of the fuel secondary filter 96 can be lowered, and the frequency of replacement of the fuel secondary filter 96 can be reduced.

Further, the fuel primary filter 3 which is coarse in pore size can be restrained from being clogged. Therefore, the fuel primary filter 93 and the fuel secondary filter 96 can be restrained from constituting resistance to fuel flow. Accordingly, an inexpensive fuel pump 91 can be adopted.

Therefore, it is possible to prolong the replacement cycle times of both the fuel primary filter 93 and the fuel secondary filter 96, and to reduce the numbers of times of maintenance of the filters 93, 96. In addition, the flow rate of the fuel passing through the fuel primary filter 93 and the fuel secondary filter 96 can be maintained at a favorable level for a long time, and it is possible to satisfactorily coped with an abrupt increase in the flow rate of the fuel required.

Furthermore, although the replacement cycle time for the fuel secondary filter 96 is shorter than the fuel primary filter 93 because the fuel secondary filter 96 is finer in pore size than the fuel primary filter 93, the dismountable arrangement of the luggage box 27 ensures that a space is formed on the front side of the fuel secondary filter 96 upon removal of the luggage box 27.

In this case, since the fuel secondary filter 96 is locked onto the rear fender 73, the operations of dismounting and mounting the fuel secondary filter 96 are easy to carry out. Besides, since the fuel secondary filter 96 is disposed along the inclination of the front portion 73a of the rear fender 73, the operations of dismounting and mounting the fuel secondary filter 96 from and onto the rear fender 73 in the vertical direction are also easy to carry out.

As shown in FIG. 4, the luggage box 27 has a capacity sufficient for accommodating a rider's helmet 68. Therefore, a large space 108 can be formed on the front side of the fuel secondary filter 96, and the work of replacing the fuel secondary filter 96 can be facilitated.

As shown in FIGS. 3, 4 and 6 above, a pressure regulator 98 for returning part of the fuel to the fuel tank 28 side when the fuel pressure in the fuel supply path 103 between the injector 102 and the fuel pump 91 is increased to reach a predetermined pressure is disposed in the fuel supply path 103 on the downstream side of the fuel secondary filter 96. Besides, the injector 102 and the pressure regulator 98 are disposed on the front side of the luggage box 27. With the pressure regulator 98 disposed on the front side of the luggage box 27, no restriction is imposed on the capacity of the luggage box 27, so that a large capacity of the luggage box 27 can be secured. In addition, the pressure regulator 98 can be disposed close to the injector 102.

Therefore, the pressure regulator 98 is placed remote from the fuel pump 91 and, accordingly, pulsation induced in the fuel by the fuel pump 91 can be suppressed.

EXAMPLE 3

Example 3 of the present invention will now be described. Incidentally, the same configurations as those shown in Example 1 and/or Example 2 above are denoted by the same symbols as used above, and detailed descriptions of them will be omitted.

Figure 16:
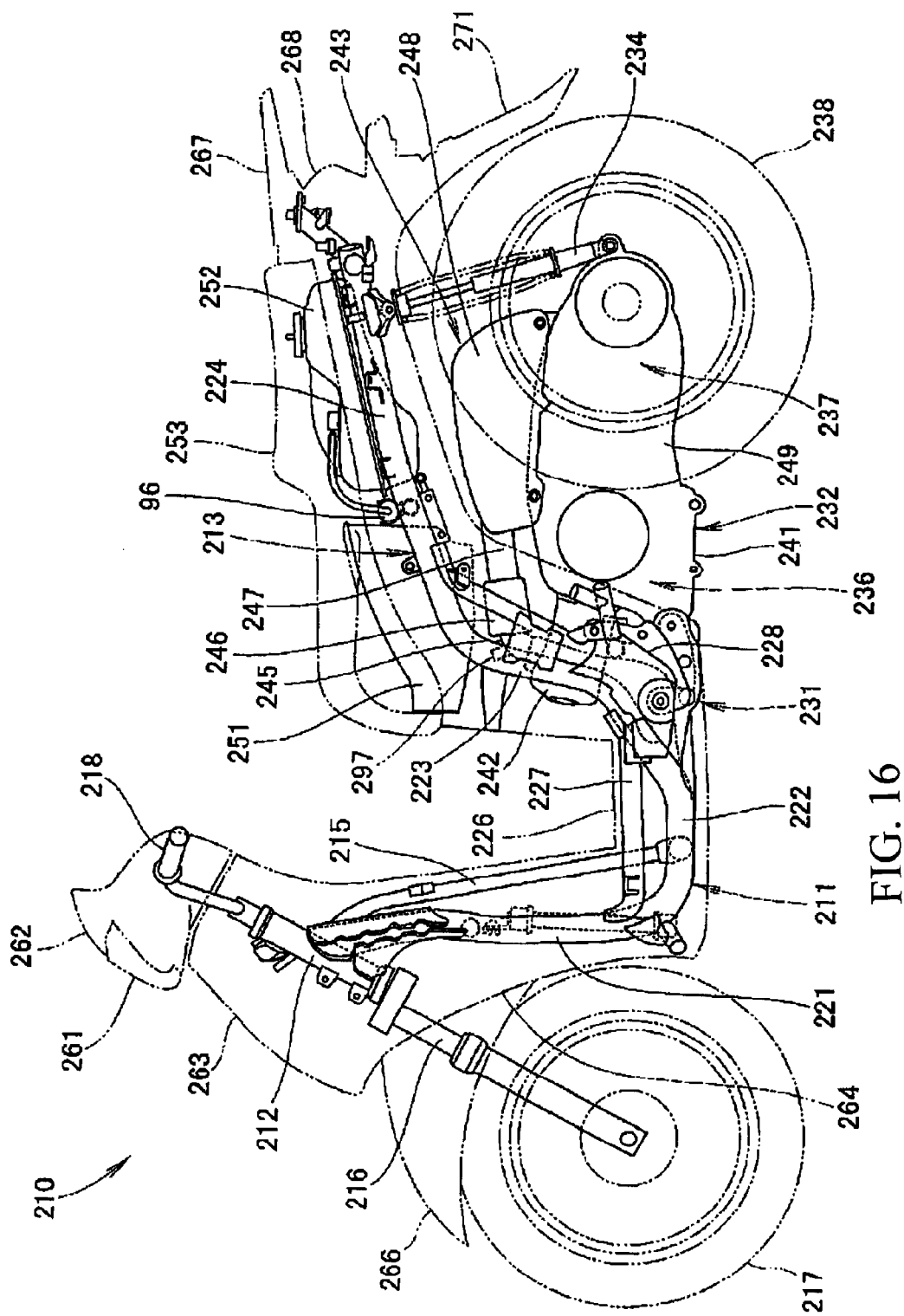
FIG. 16 is a side view of a motorcycle pertaining to the invention (Example 3)

As shown in FIG. 16, a motorcycle 210 has a body frame 211 serving as a skeleton. The body frame 211 is of a motor scooter type one, which includes: a head pipe 212 constituting a front end portion of the body frame 211; a pair of left and right main frames 213 and 214 (only symbol 213 on the viewer's side is shown) extending from the head pipe 212 sequentially downward, rearward, and rearwardly upward; and a plurality of cross pipes which extend in the vehicle width direction and which interconnect the main frames 213, 214. Incidentally, symbol 215 denotes a front down frame extending from the head pipe 212 to one of the cross pipes between the main frames 213 and 214.

A front fork 216 is steerably mounted to the head pipe 212, a front wheel 217 is mounted to the lower ends of the front fork 216, and a bar handle 218 is attached to the upper end of the front fork 216.

The main frames 213, 214 include: down frame parts 221, 221 (only symbol 221 on the viewer's side is shown) extending downward from the head pipe 212; front bottom parts 222, 222 (only symbol 222 on the viewer's side is shown) extending rearward from the lower ends of the down frame parts 221, 221; center slant parts 223, 223 (only symbol 223 on the viewer's side is shown) extending rearwardly upward from the front bottom parts 222, 222; and rear frame parts 224, 224 (only symbol 224 on the viewer's side is shown) extending rearwardly upward in substantially rectilinear form from the upper ends of the center slant parts 223, 223.

Between the left and right down frame parts 221 and center slant parts 223, a step support frame 227 extending in the front-rear direction and supporting a step floor 226 is bridgingly arranged.

Pivot plates 228, 228 (only symbol 228 on the viewer's side is shown) are attached to the center slant parts 223, 223, and a lower front portion of a power unit 232 is mounted to the pivot plates 228, 228 through a link device 231. Incidentally, symbol 234 denotes a rear cushion unit bridgingly arranged between a rear end portion of the main frame 213 and a rear end portion of the power unit 232.

The power unit 232 is composed of an engine 236 constituting a front portion of the power unit 232, and a continuously variable transmission 237 provided integrally with the engine 236 so as to extend rearward from a side portion of the engine 236. Incidentally, symbol 238 denotes a rear wheel which is attached to an output shaft provided at a rear end portion of the continuously variable transmission 237.

The engine 236 has a cylinder section 242 extending forward from a crankcase 241, and an intake system 243 is connected to an upper portion of the cylinder section 242.

The intake system 243 includes an intake pipe 245, a throttle body 246, a connecting tube 247, and an air cleaner 248 in this order from the cylinder section 242 side. The air cleaner 248 is mounted to an upper portion of a transmission case 249 provided at a rear portion of the crankcase 241.

A luggage box 251 and a fuel tank 252 arranged on the rear side of the luggage box 251 are mounted to the rear frame parts 224, 224. A seat 253 is so disposed as to cover the upper side of the luggage box 251 and the fuel tank 252.

In the figure, symbol 261 denotes a headlamp, 262 denotes a handle cover, 263 denotes a front cover, 264 denotes a leg shield, 266 denotes a front fender, 267 denotes a rear carrier, 268 denotes a tail lamp, and 271 denotes a rear fender.

Figure 17:
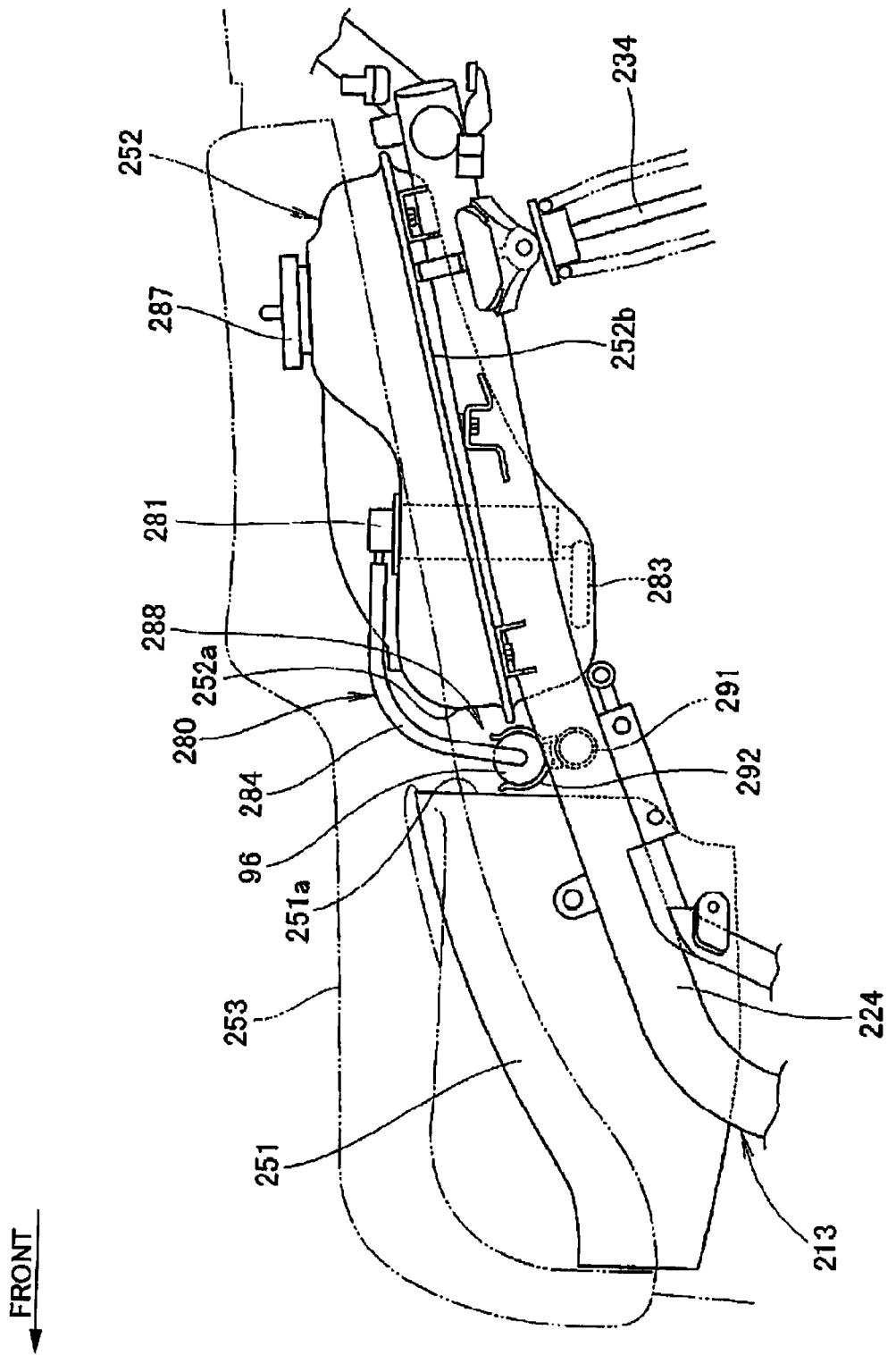
FIG. 17 is a side view of a rear portion of the motorcycle pertaining to the invention (Example 3)

As shown in FIG. 17, a fuel supply system 280 for supplying a fuel from the fuel tank 252 to the engine 236 (see FIG. 16) includes the fuel tank 252, a fuel pump 281 attached to an upper portion of the fuel tank 252, a fuel primary filter 283 annexed to the fuel pump 281, and a fuel secondary filter 96 connected to the fuel pump 281 through a fuel pipe 284. Incidentally, symbol 287 denotes a cap for closing a fuel filler port of the fuel tank 252.

A rear cross pipe 291 extending in the vehicle width direction is bridgingly arranged between the rear frame parts 224, 224 of the main frames 213, 214 (only symbol 213 on the viewer's side is shown) and between the luggage box 251 and the fuel tank 252. A metallic fixture 292 is attached to an upper portion of the rear cross pipe 291, and the fuel secondary filter 96 is held by the metallic fixture 292, whereby the fuel secondary filter 96 is disposed in a space 288 formed between a rear wall 251a of the luggage box 251 and a front wall 252a of the fuel tank 252.

Figure 18:
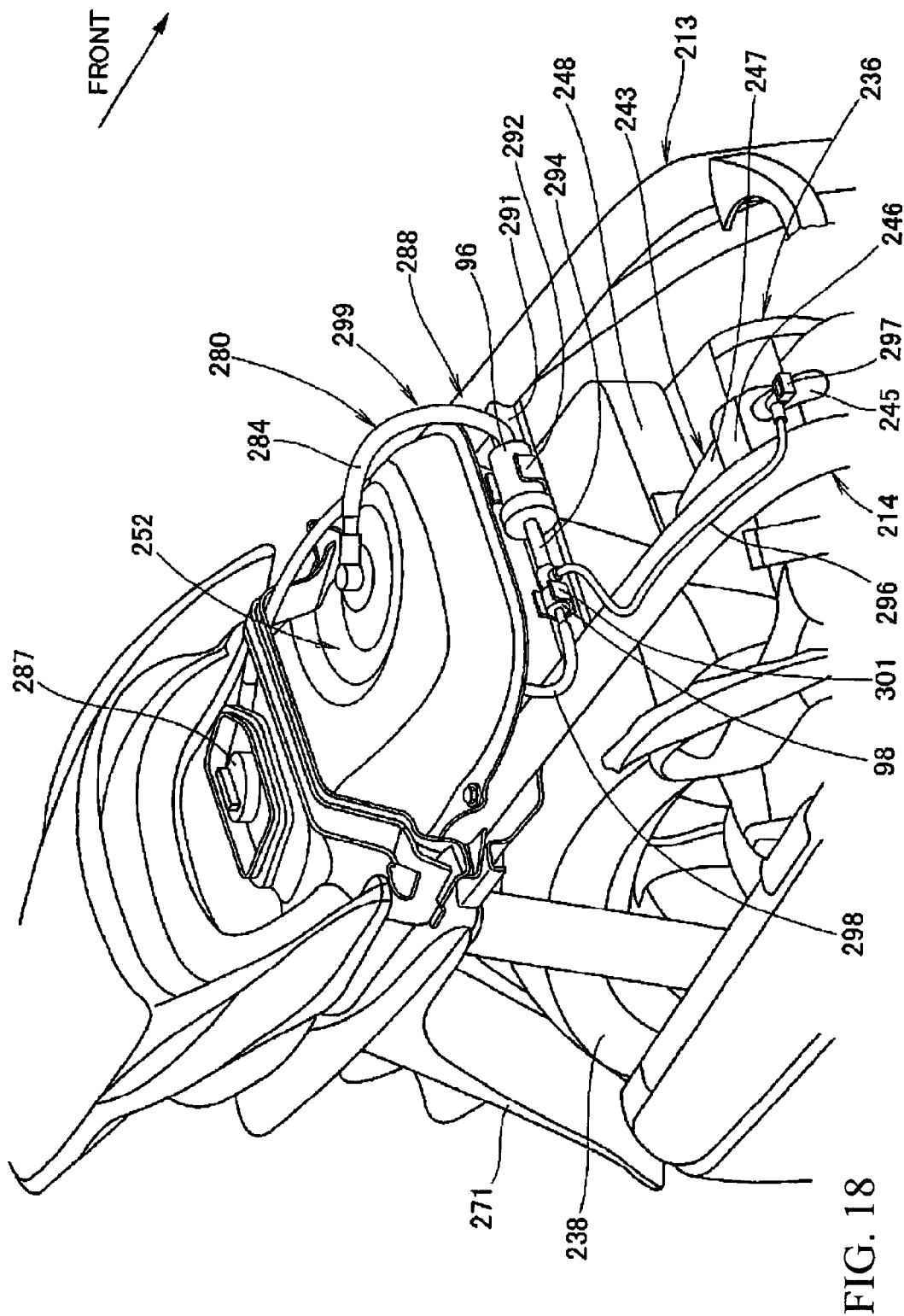
FIG. 18 is a perspective view of a rear portion of the motorcycle pertaining to the invention (Example 3)

As shown in FIG. 18, in addition to the configuration described with reference to FIG. 17, the fuel supply system 280 includes a pressure regulator 98 connected to the fuel secondary filter 96 through a fuel pipe 294, an injector 297 connected to the pressure regulator 98 through a fuel pipe 296, and a return pipe 298 interconnecting the pressure regulator 98 and the fuel tank 252. The injector 297 is attached to the intake pipe 245 of the intake system 243.

The fuel supply system 280 is provided with a fuel supply path 299 extending from the fuel tank 252 to the injector 297, exclusively of the return pipe 298.

The pressure regulator 98 is held by a metallic fixture 301 attached to the rear cross pipe 291, and is disposed in a space 288 formed between the luggage box 251 (see FIG. 17) and the fuel tank 252.

The fuel pipe 296 is extend from the rear cross pipe 291 side toward the main frame 214 on the right side, is further extended forward along the main frame 214, and is connected to the injector 297.

The return pipe 298 is connected at its one end to the pressure regulator 98, and at its other end to a return port provided at a bottom portion of the fuel tank 252.

Figure 19:
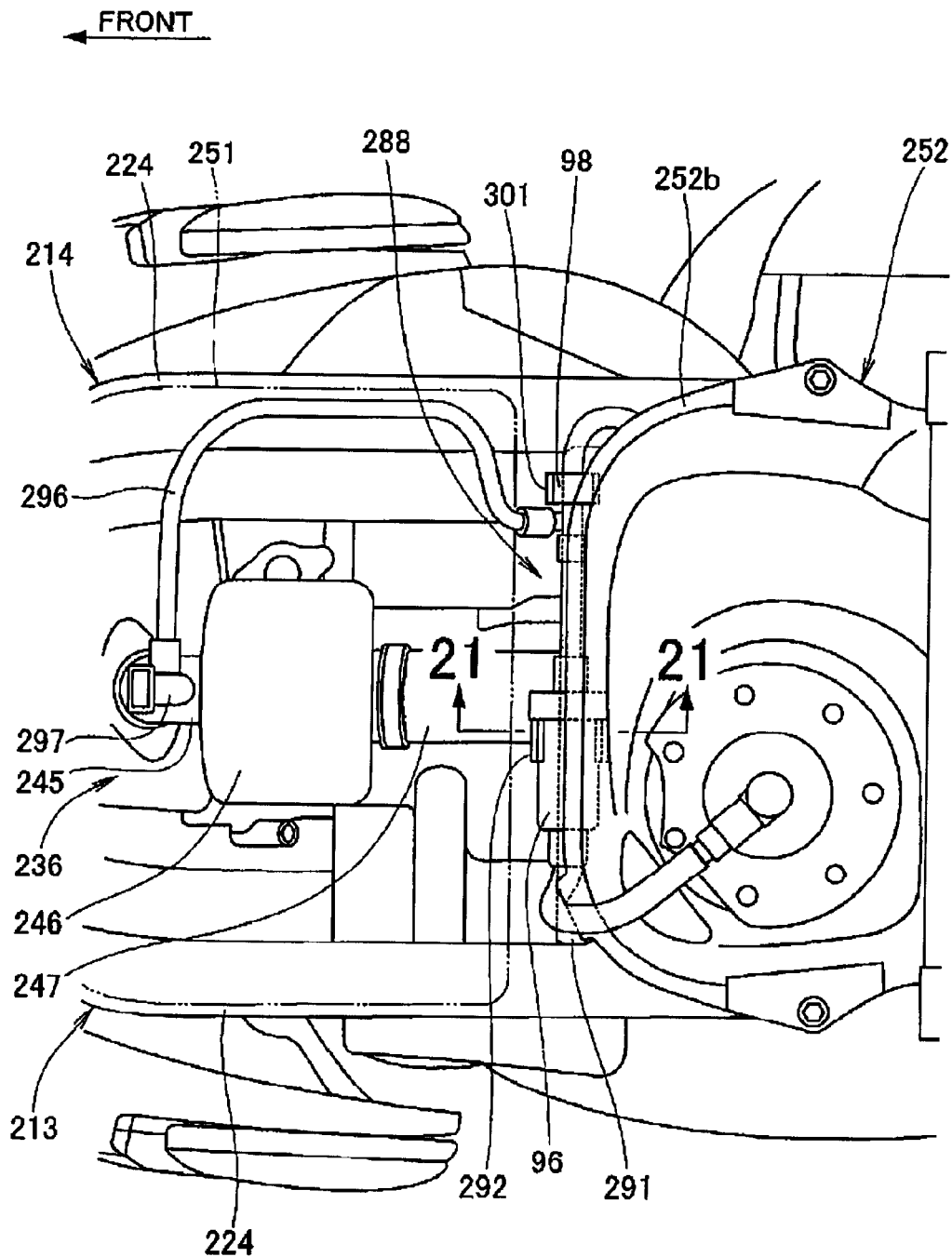
FIG. 19 is a plan view of a major part of the motorcycle pertaining to the invention (Example 3)

As shown in FIG. 19, the fuel secondary filter 96 and the pressure regulator 98 are disposed in the space 288 between the luggage box 251 and the fuel tank 252 in the condition where upper parts of them are covered by a front end portion (inclusive of a part of a flange portion 252b provided at a peripheral edge portion of the fuel tank 252) of the fuel tank 252. With the fuel secondary filter 96 and the pressure regulator 98 thus disposed in the space 288 between the luggage box 251 and the fuel tank 252, the space 288 can be utilized effectively, and a compactor vehicle body can be promised.

Figure 20:
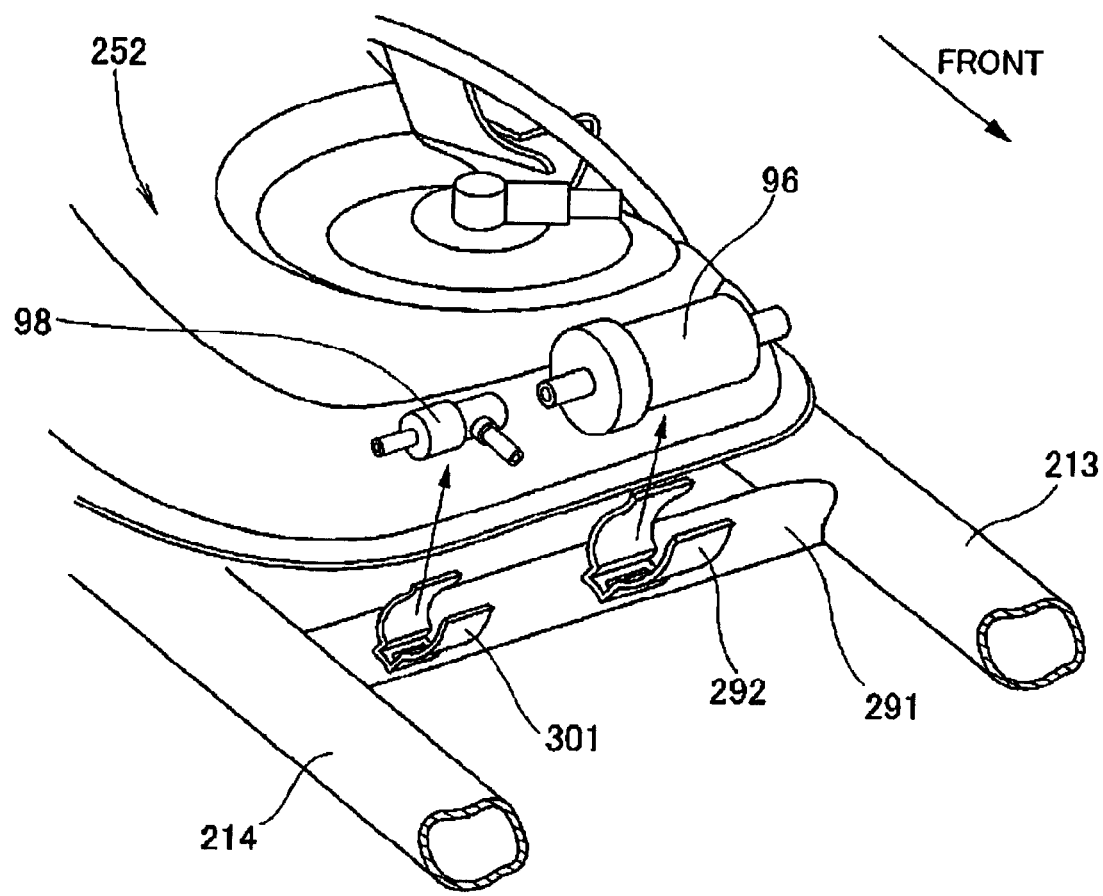
FIG. 20 is a perspective view showing a mounting structure of a fuel supply system pertaining to the invention (Example 3)

As shown in FIG. 20, the metallic fixtures 292 and 301 attached to the rear cross pipe 291 hold the fuel secondary filter 96 and the pressure regulator 98 by their resilience. Therefore, the fuel secondary filter 96 and the pressure regulator 98 can be easily dismounted as indicated by arrows in the figure, and can be easily mounted in position.

Figure 21:
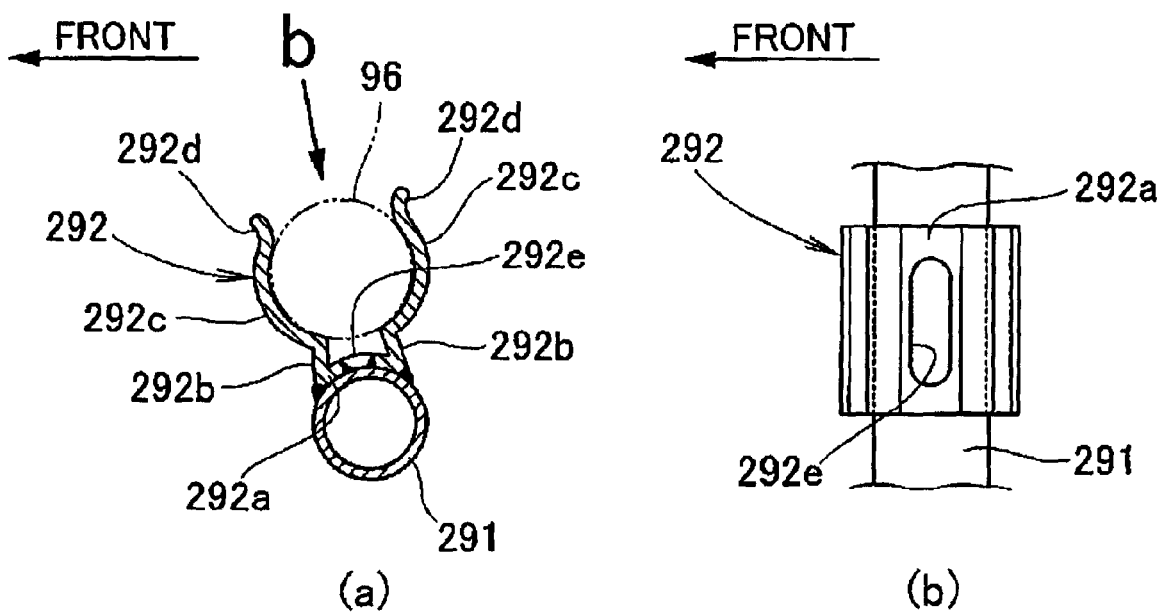
FIG. 21 shows illustrations of a mounting structure of a fuel secondary filter pertaining to the invention (Example 3).

FIG. 21(a) is a sectional view taken alone line 21-21 of FIG. 19. As shown in the figure, the metallic fixture 292 for mounting the fuel secondary filter 96 is a member which is formed by bending a steel plate and which includes: a bottom part 292a attached to the rear cross pipe 291; riser parts 292b, 292b extending upward from the front edge and the rear edge of the bottom part 292a; circular arched parts 292c, 292c extending upward from the upper edges of the riser parts 292b, 292b; and upper-end bent parts 292d, 292d bent from the upper edges of the circular arched parts 292c, 292c. The fuel secondary filter 96 is held between the circular arched parts 292c, 292c by resilience.

The metallic fixture 301 (see FIG. 20) for mounting the pressure regulator 98 is equivalent to the metallic fixture 292 in structure, through the two fixtures are different in size.

FIG. 21(b) is a view taken along arrow b of FIG. 21(a). As shown in the figure, the bottom part 292a of the metallic fixture 292 is provided with a slot 292e extending in the vehicle width direction, and the edge of the slot 292e is welded to the rear cross pipe 291.

As shown in FIGS. 16 to 18 above, the motorcycle 210 includes the head pipe 212, the main frames 213 and 214 (only symbol 213 on the viewer's side is shown) as frame members extending rearward from the head pipe 212, the luggage box 251 disposed on a rear upper side of the main frames 213 and 214, the fuel tank 252 disposed on a rear upper side of the main frames 213 and 214 and on the rear side of the luggage box 251, the fuel supply path 299 for supplying the fuel in the fuel tank 252 to the engine 236 side, and the fuel secondary filter 96 disposed as a fuel filter in the course of the fuel supply path 299. The motorcycle 210 is characterized in that the fuel secondary filter 96 is disposed between the rear wall 251a of the luggage box 251 and the front wall 252a of the fuel tank 252.

This configuration makes it possible to dispose the fuel secondary filter 96 while utilizing effectively the dead space (space 288) formed between the rear wall 251a of the luggage box 251 and the front wall 252a of the fuel tank 252, and to dispose the fuel secondary filter 96 while securing capacities, or sizes in the vertical direction, of the luggage box 251 and the fuel tank 252.

As shown in FIGS. 17, 19 and 20 above, the rear cross pipe 291 as a cross pipe is disposed in the space 288 between the rear wall 251a of the luggage box 251 and the front wall 252a of the fuel tank 252, the rear cross pipe 291 extend in the vehicle width direction to join the pair of left and right main frames 213 and 214 to each other, the fuel secondary filter 96 is dismountably supported on the rear cross pipe 291 through the metallic fixture 292, and the longitudinal direction of the fuel secondary filter 96 is set along the rear cross pipe 291. Therefore, the luggage box 251 and the fuel tank 252 can be disposed close to each other in the front-rear direction, whereby the motorcycle 10 (see FIG. 16) can be made shorter in length along the front-rear direction.

Incidentally, while in the above-described example the fuel secondary filter 96 has been disposed in the space 108 between the rear wall 27c of the luggage box 27 and the front portion 73a of the rear fender 73 and in such a manner that its longitudinal direction is set along the extending direction of the rear frames 14 and 16, together with the protuberant portion 73c, as shown in FIG. 5, this configuration is not limitative; for example, the fuel secondary filter 96 may be disposed in the space 108 so that its longitudinal direction extends in the vehicle width direction.

The present invention is favorably applicable to a motorcycle having a fuel filter in the exterior of a fuel tank.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A motorcycle, comprising:
a single main frame extending rearwardly downward from a head pipe;
a pair of left and right rear frames extending rearwardly upward from the main frame;
a luggage box disposed on a front side of a rear wheel and on an upper side of the rear frames;
a fuel tank disposed on an upper side of the rear wheel and on a rear side of the luggage box;
a rear fender extending between the left and right rear frames, disposed between the luggage box and the rear wheel, and covering the rear wheel on the front and upper sides of the rear wheel;
a fuel supply path for supplying a fuel in the fuel tank to an engine side; and
a fuel filter disposed in the fuel supply path,
wherein the rear fender disposed such that its front portion faces a rear wall of the luggage box, the front portion inclined rearwardly upward so that a distance thereto from the rear wall increases long an upward direction, and
wherein the fuel filter is disposed between the rear wall of the luggage box and the front portion of the rear fender,
wherein the fuel supply path comprises:
a fuel pump;
an injector for injecting the fuel, to the engine side; and
a fuel primary filter disposed on an upstream side of the fuel pump,
wherein the fuel filler is a fuel secondary filter disposed on a downstream side of the fuel pump and the fuel primary filter,
wherein the fuel secondary filter is set to be finer in pore size than the fuel primary filter, and is locked onto the rear fender in the state of being along the inclination of the front portion of the rear fender, and
wherein the luggage box is detachably attached to the rear frame and the fuel tank.

2. The motorcycle according to claim 1, wherein the luggage box has a capacity sufficient for accommodating a rider's helmet.

3. The motorcycle according to claim 1, wherein the fuel supply path is provided on a downstream side of the fuel secondary filter, with a pressure regulator by which part of the fuel is returned to the fuel, tank side when a fuel pressure in the fuel supply path between the injector and the fuel pump is increased, to reach a predetermined, pressure, and
wherein the injector and the pressure regulator are disposed on the front side of the luggage box.

4. A motorcycle, comprising:
a single main frame extending rearwardly downward from a head pipe;
a pair of left and right rear frames extending rearwardly upward from the main frame;
a luggage box disposed on a front side of a rear wheel and on an upper side of the rear frames;
a fuel tank disposed on an upper side of the rear wheel and on a rear side of the luggage box;
a rear fender extending between the left and right rear frames, disposed between the luggage box and the rear wheel, and covering the rear wheel on the front and upper sides of the rear wheel;
a fuel supply path for supplying a fuel in the fuel tank to an engine side; and
a fuel filter disposed in the fuel supply path,
wherein the rear fender disposed such that its front portion faces a rear wall of the luggage box, the front portion inclined rearwardly upward so that a distance thereto from the rear wall increases along an upward direction, and wherein the fuel filter is disposed between the rear wall of the luggage box and the front portion of the rear fender, wherein the rear fender comprises a protuberant portion projecting toward the rear wall of the luggage box, wherein the protuberant portion does not interfere with the rear wheel, wherein the rear frames are disposed on left and right sides of the protuberant portion, wherein the fuel filter is disposed between the protuberant portion and the rear frame, and wherein the fuel filter is provided between the protuberant portion and the rear frame, and the rear fender includes a recessed portion which is recessed toward the rear wheel and which accommodates at least a part of the fuel filter.

5. The motorcycle according to claim 4, wherein the fuel filter is disposed such that its longitudinal direction is set along an extending direction of the rear frame, together with the protuberant portion of the rear fender.

6. The motorcycle according to claim 4, wherein the luggage box has a capacity sufficient for accommodating a rider's helmet.

\* \* \* \* \*